(12) United States Patent
Matsumoto et al.

(10) Patent No.: US 9,896,529 B2
(45) Date of Patent: Feb. 20, 2018

(54) METHOD FOR PRODUCING POLYACRYLIC ACID (SALT)-BASED WATER-ABSORBABLE RESIN

(71) Applicant: NIPPON SHOKUBAI CO., LTD., Osaka-shi, Osaka (JP)

(72) Inventors: Satoshi Matsumoto, Himeji (JP); Kunihiko Ishizaki, Himeji (JP); Shinichi Fujino, Himeji (JP)

(73) Assignee: NIPPON SHOKUBAI CO., LTD., Osaka-Shi, Osaka (JP)

( * ) Notice: Subject to any disclaimer, the term of this patent is extended or adjusted under 35 U.S.C. 154(b) by 0 days.

(21) Appl. No.: 15/123,106

(22) PCT Filed: Mar. 2, 2015

(86) PCT No.: PCT/JP2015/056104
§ 371 (c)(1),
(2) Date: Sep. 1, 2016

(87) PCT Pub. No.: WO2015/133440
PCT Pub. Date: Sep. 11, 2015

(65) Prior Publication Data
US 2017/0066862 A1    Mar. 9, 2017

(30) Foreign Application Priority Data
Mar. 3, 2014 (JP) ................. 2014-040651

(51) Int. Cl.
| | |
|---|---|
| *C08F 20/06* | (2006.01) |
| *C08F 2/10* | (2006.01) |
| *C08F 220/06* | (2006.01) |
| *B01J 20/26* | (2006.01) |

(52) U.S. Cl.
CPC ......... *C08F 220/06* (2013.01); *B01J 20/261* (2013.01); *C08F 2/10* (2013.01)

(58) Field of Classification Search
CPC .................................... C08F 20/06
USPC .................................... 526/317.1
See application file for complete search history.

(56) References Cited

U.S. PATENT DOCUMENTS

| | | | |
|---|---|---|---|
| 4,698,404 A | 10/1987 | Cramm et al. | |
| 4,833,222 A | 5/1989 | Siddall et al. | |
| 5,118,719 A | 6/1992 | Lind | |
| 5,185,413 A | 2/1993 | Yoshinaga et al. | |
| 5,264,495 A | 11/1993 | Irie et al. | |
| 5,342,899 A | 8/1994 | Graham et al. | |
| 5,455,284 A | 10/1995 | Dahmen et al. | |
| 5,563,276 A | 10/1996 | Takeuchi et al. | |
| 5,789,507 A | 8/1998 | Tanaka et al. | |
| 5,856,370 A | 1/1999 | Chmelir | |
| 5,985,944 A | 11/1999 | Ishizaki et al. | |
| 6,107,358 A | 8/2000 | Harada et al. | |
| 6,335,406 B1 | 1/2002 | Nagasuna et al. | |
| 6,750,262 B1 | 6/2004 | Hahnle et al. | |
| 7,915,355 B2* | 3/2011 | Weismantel | ........... A61L 15/60 526/317.1 |
| 2002/0120074 A1 | 8/2002 | Wada et al. | |
| 2004/0092688 A1 | 5/2004 | Dairoku et al. | |
| 2005/0137546 A1 | 6/2005 | Joy et al. | |
| 2006/0020049 A1 | 1/2006 | Champ et al. | |
| 2006/0089611 A1 | 4/2006 | Herfert et al. | |
| 2007/0225422 A1 | 9/2007 | Sakamoto et al. | |
| 2008/0200623 A1 | 8/2008 | Weismantel et al. | |
| 2008/0221282 A1 | 9/2008 | Weismantel et al. | |
| 2008/0227933 A1 | 9/2008 | Funk et al. | |
| 2008/0275195 A1 | 11/2008 | Weismantel et al. | |
| 2009/0208748 A1 | 8/2009 | Torii et al. | |
| 2009/0298685 A1 | 12/2009 | Torii et al. | |
| 2010/0041824 A1 | 2/2010 | Torii et al. | |
| 2010/0057027 A1 | 3/2010 | Furno et al. | |
| 2010/0093917 A1 | 4/2010 | Torii et al. | |
| 2010/0268181 A1 | 10/2010 | Ziemer et al. | |
| 2011/0015288 A1 | 1/2011 | Ranft et al. | |
| 2011/0021725 A1 | 1/2011 | Takaai et al. | |
| 2011/0039961 A1 | 2/2011 | Matsumoto et al. | |
| 2011/0313113 A1* | 12/2011 | Sakamoto | ................. C08F 2/10 525/384 |
| 2012/0258851 A1 | 10/2012 | Nakatsuru et al. | |
| 2013/0026412 A1 | 1/2013 | Machida et al. | |
| 2013/0101851 A1 | 4/2013 | Takaai et al. | |
| 2013/0123454 A1 | 5/2013 | Yokoyama et al. | |

FOREIGN PATENT DOCUMENTS

| | | |
|---|---|---|
| EP | 2669318 A1 | 12/2013 |
| JP | 1-146902 | 6/1989 |
| JP | 2-255804 | 10/1990 |
| JP | 2-300210 | 12/1990 |
| JP | 3-052903 | 3/1991 |
| JP | 4-227705 | 8/1992 |
| JP | 5-508674 | 2/1993 |
| JP | 5-237378 | 9/1993 |
| JP | 6-510551 | 11/1994 |
| JP | 8-092307 | 4/1996 |
| JP | 8-253518 | 10/1996 |
| JP | 8-283318 | 10/1996 |
| JP | 9-507085 | 7/1997 |
| JP | 10-057805 | 3/1998 |
| JP | 10-251308 | 9/1998 |

(Continued)

OTHER PUBLICATIONS

International Preliminary Report on Patentability of PCT/JP2015/056104 dated Sep. 15, 2016.

(Continued)

*Primary Examiner* — Vu A Nguyen
(74) *Attorney, Agent, or Firm* — Harness, Dickey & Pierce, P.L.C.

(57) ABSTRACT

The present invention provides a method for producing, by adding an additive and/or gas bubbles to a monomer with high efficiency, a polyacrylic acid (salt)-based water-absorbing resin having high physical properties while high productivity is maintained. The step of preparing an aqueous monomer solution includes the steps of: preparing an aqueous solution; and adding a water-insoluble additive and/or gas bubbles. A retention time from when the water-insoluble additive and/or the gas bubbles is/are added to when polymerization starts is 1 second to 60 seconds.

8 Claims, No Drawings

(56) References Cited

FOREIGN PATENT DOCUMENTS

| | | |
|---|---|---|
| JP | 10-251310 | 9/1998 |
| JP | 11-147902 | 6/1999 |
| JP | 2000-000463 | 1/2000 |
| JP | 2000-038407 | 2/2000 |
| JP | 2002-538254 | 11/2002 |
| JP | 2004-155963 | 6/2004 |
| JP | 2006-503134 | 1/2006 |
| JP | 2006-521431 | 9/2006 |
| JP | 2007-514833 | 6/2007 |
| JP | 2007-284675 A | 11/2007 |
| JP | 2009-507096 | 2/2009 |
| JP | 2009-507117 | 2/2009 |
| JP | 2009-507118 | 2/2009 |
| JP | 2009-507119 | 2/2009 |
| JP | 2009-528412 | 8/2009 |
| JP | 2009-531467 | 9/2009 |
| JP | 2009-280668 | 12/2009 |
| JP | 2010-521537 | 6/2010 |
| JP | 2011-505436 | 2/2011 |
| JP | 2011-519381 | 7/2011 |
| WO | WO-1996/17884 A1 | 6/1996 |
| WO | WO-2008/114847 A1 | 9/2008 |
| WO | WO-2008/114848 A1 | 9/2008 |
| WO | WO-2009/123193 A1 | 10/2009 |
| WO | WO-2010/095427 A1 | 8/2010 |
| WO | WO-2011/078298 A1 | 6/2011 |
| WO | WO-2011/120746 A1 | 10/2011 |
| WO | WO-2012-014747 A1 | 2/2012 |
| WO | WO-2012/156242 A2 | 11/2012 |

OTHER PUBLICATIONS

International Search Report of PCT/JP2015/056104 dated Apr. 14, 2015.

Modern Superabsorbent Polymer Technology (1998), p. 69-117.

Office Action dated Mar. 31, 2017 issued in Corresponding Chinese Patent Application No. 201580011773.2.

* cited by examiner

METHOD FOR PRODUCING POLYACRYLIC ACID (SALT)-BASED WATER-ABSORBABLE RESIN

PRIORITY STATEMENT

This patent application is a U.S. national stage filing under 35 U.S.C. § 371 of International Application No. PCT/JP2015/056104 filed on 2 Mar. 2015, which claims priority to Japanese Patent Application No. 2014-040651 filed on 3 Mar. 2014. The entire disclosures of each of the above recited applications are incorporated herein by reference.

TECHNICAL FIELD

The present invention relates to a method for producing a polyacrylic acid (salt)-based water-absorbing resin. More specifically, the present invention relates to a method of producing a water-absorbing resin same with excellent physical properties in a safely manner while maintaining high productivity.

BACKGROUND ART

A water-absorbing resin (SAP/Super Absorbent Polymer) is a water-swellable, water-insoluble polymer gelatinizer, and is frequently used for absorbents. Examples of the absorbents encompass sanitary materials such as disposable diapers and sanitary napkins, agricultural and horticultural water retaining agents, and industrial waterproofing materials.

Examples of a raw material of the water-absorbing resin encompass a large number of monomers and hydrophilic polymers. Industrially most common among such water-absorbing resins is a polyacrylic acid (salt)-based water-absorbing resin in which an acrylic acid and/or a salt thereof is used as a monomer(s), because such a polyacrylic acid (salt)-based water-absorbing resin has high water absorption performance.

The water-absorbing resin is produced as a product in the form of particles through various processes such as polymerization, drying, crushing, classification, and surface crosslinking (Non-Patent Literature 1). In line with enhancing performance of disposable diapers for which the water-absorbing resin is mainly used, the water-absorbing resin is required to have a large number of functions (physical properties). Examples of the functions (physical properties) in addition to fluid retention capacity encompass gel strength, water soluble component, water absorption speed, fluid retention capacity under pressure, liquid permeability, particle size distribution, urine resistance, antibacterial property, impact resistance (damage resistance), powder fluidity, deodorizing property, coloration resistance (whiteness), and dust resistance.

In addition, for the purpose of increasing productivity (particularly polymerizability) and water absorption performance of the water-absorbing resin, a technique to add an additive to a monomer has been proposed.

Specifically, having been proposed are techniques concerning an internal crosslinking agent as an additive, that is, a technique to disperse an internal crosslinking agent using a dispersing agent (Patent Literature 1), a technique to use internal crosslinking agents having different reaction mechanisms in combination (Patent Literatures 2 and 3), and a technique, in which a length of time between addition of an internal crosslinking agent and introduction of a resultant mixture into a polymerization device is specified (Patent Literature 4).

Also having been proposed are techniques concerning a polymerization initiator as an additive, that is, a techniques concerning a photopolymerization initiator having a benzoyl group (Patent Literature 5), a technique in which a polymerization initiator is continuously added (Patent Literature 6), and a technique in which a polymerization initiator is diluted and then added (Patent Literature 7).

Also having been proposed are techniques concerning a reducing agent as an additive, that is, a technique in which a sulfinic acid derivative is added and polymerized (Patent Literature 8), a technique in which an oxygen concentration is reduced with the use of a reducing agent and then polymerization is carried out (Patent Literature 9), and a technique in which a reducing agent is added in a polymerization device (Patent Literature 10).

Also having been proposed are techniques concerning a chain transfer agent as an additive that is a technique in which a chain transfer agent is used in carrying out reverse phase suspension polymerization (Patent Literature 11), techniques in each of which a hypophosphorous acid is used (Patent Literatures 12 and 13), and a technique in which a thiol compound is used (Patent Literature 14).

Also having been proposed are techniques concerning a surfactant as an additive, that is a technique in which a fluorine-based surfactant is used (Patent Literature 15), a technique in which an organometallic surfactant is used (Patent Literature 16), and a technique in which solubility of gas is lowered in the presence of a surfactant (Patent Literature 17).

Also having been proposed are techniques concerning a chelating agent as an additive, that is a technique in which polymerization is carried out in the presence of a certain chelating agent (Patent Literatures 18 and 19) and a technique in which a ratio of iron ion to a chelating agent is controlled (Patent Literature 20).

Also having been proposed are techniques concerning, as additives, a water-insoluble polymer (particularly a water-absorbing resin fine powder) and a fibrous material, that is techniques in each of which a water-absorbing resin fine powder is added to an aqueous monomer solution so as to polymerize the aqueous monomer solution (Patent Literatures 21 through 25), a technique in which starch is added to an aqueous monomer solution so as to polymerize the aqueous monomer solution (Patent Literature 26), and a technique in which a fibrous material is added to an aqueous monomer solution so as to polymerize the aqueous monomer solution (Patent Literature 27).

Also having been proposed are techniques concerning inorganic fine particles as an additive, that is a technique in which an aqueous monomer solution containing a water-insoluble solid matter is subjected to high-temperature polymerization (Patent Literature 21) and a technique in which inorganic fine particles are added to carry out polymerization (Patent Literature 28).

Also having been proposed are techniques concerning a foaming agent (gas generating agent) as an additive, that is a technique in which a carbonate is used (Patent Literature 29), a technique in which an encapsulated foaming agent is used (Patent Literature 30), a technique in which a reverse phase suspension polymerization is carried out in the presence of a foaming agent (Patent Literature 31), techniques in each which an azo compound is used (Patent Literatures 32 and 33), and a technique in which a solid azo compound is dispersed in an aqueous monomer solution (Patent Literature 34).

Also having been proposed are techniques for improving a water absorption speed of a water-absorbing resin, that is techniques concerning methods for continuously mixing gases (Patent Literatures 35 and 36), a technique in which gas bubbles are dispersed in the presence of a surfactant and a solubilizer (Patent Literature 37), a technique in which miorobubbles are introduced (Patent Literature 38), a technique in which gases are mixed with the use of a microreactor (Patent Literature 39), and a technique in which gas is dissolved in an aqueous monomer solution under reduced pressure (Patent Literature 40).

CITATION LIST

Patent Literature

[Patent Literature 1]
Japanese Patent Application Publication Tokukaihei No. 1-146902 (Publication Date: Jun. 8, 1989)
[Patent Literature 2]
Pamphlet of International Publication No. WO 2008/114848
[Patent Literature 3]
Pamphlet of International Publication No. WO 2008/114847
[Patent Literature 4]
Japanese Translation of PCT Patent Application Publication, Tokuhyo, No. 2009-507118 (Publication Date: Feb. 19, 2009)
[Patent Literature 5]
Japanese Patent Application Publication Tokukaihei No. 8-092307 (Publication Date: Apr. 9, 1996)
[Patent Literature 6]
Japanese Patent Application Publication Tokukai No. 2004-155963 (Publication Date: Jun. 3, 2004)
[Patent Literature 7]
Pamphlet of International Publication No. WO 2009/123193
[Patent Literature 8]
Japanese Translation of PCT Patent Application Publication, Tokuhyo, No. 2006-521431 (Publication Date: Sep. 21, 2006)
[Patent Literature 9]
Japanese Translation of PCT Patent Application Publication, Tokuhyo, No. 2009-507119 (Publication Date: Feb. 19, 2009)
[Patent Literature 10]
Japanese Translation of PCT Patent Application Publication, Tokuhyo, No. 2009-507096 (Publication Date: Feb. 19, 2009)
[Patent Literature 11]
Specification of U.S. Pat. No. 4,698,404
[Patent Literature 12]
Japanese Patent Application Publication Tokukaihei No. 2-255804 (Publication Date: Oct. 16, 1990)
[Patent Literature 13]
Japanese Patent Application Publication Tokukaihei No. 2-300210 (Publication Date: Dec. 12, 1990)
[Patent Literature 14]
Japanese Patent Application Publication Tokukaihei No. 8-253518 (Publication Date: Oct. 1, 1996)
[Patent Literature 15]
Japanese Patent Application Publication Tokukaihei No. 10-057805 (Publication Date: Mar. 3, 1998)
[Patent Literature 16]
Japanese Patent Application Publication Tokukaihei No. 10-251308 (Publication Date: Sep. 22, 1998)
[Patent Literature 17]
Pamphlet of International Publication No. WO 2011/078298
[Patent Literature 18]
Japanese Patent Application Publication Tokukaihei No. 8-283318 (Publication Date: Oct. 29, 1996)
[Patent Literature 19]
Japanese Patent Application Publication Tokukai No. 2000-038407 (Publication Date: Feb. 8, 2000)
[Patent Literature 20]
Pamphlet of International Publication No. WO 2011/120746
[Patent Literature 21]
Japanese Patent Application Publication Tokukai No. 2007-284675 (Publication Date: Nov. 1, 2007)
[Patent Literature 22]
Japanese Translation of PCT Patent Application Publication, Tokuhyo, No. 2011-505436 (Publication Date: Feb. 24, 2011)
[Patent Literature 23]
Japanese Translation of PCT Patent Application Publication, Tokuhyo, No. 2009-528412 (Publication Date: Aug. 6, 2009)
[Patent Literature 24]
Japanese Translation of PCT Patent Application Publication, Tokuhyo, No. 2006-503134 (Publication Date: Jan. 26, 2006)
[Patent Literature 25]
Japanese Patent Application Publication Tokukaihei No. 3-052903 (Publication Date: Mar. 7, 1991)
[Patent Literature 26]
Japanese Patent Application Publication Tokukaihei No. 4-227705 (Publication Date: Aug. 17, 1992)
[Patent Literature 27]
Japanese Patent Application Publication Tokukaihei No. 5-508674 (Publication Date: Dec. 2, 1993)
[Patent Literature 28]
Japanese Patent Application Publication (Translation of PCT Application), Tokuhyohei, No. 6-510551 (Publication Date: Nov. 24, 1994)
[Patent Literature 29]
Japanese Patent Application Publication Tokukaihei No. 5-237378 (Publication Date: Sep. 17, 1993)
[Patent Literature 30]
Japanese Translation of PCT Patent Application Publication, Tokuhyo, No. 2007-514833 (Publication Date: Jun. 7, 2007)
[Patent Literature 31]
Japanese Translation of PCT Patent Application Publication, Tokuhyo, No. 2009-280668 (Publication Date: Dec. 3, 2009)
[Patent Literature 32]
Japanese Translation of PCT Patent Application Publication, Tokuhyohei, No. 9-507085 (Publication Date: Jul. 15, 1997)
[Patent Literature 33]
Japanese Patent Application Publication Tokukaihei No. 11-147902 (Publication Date: Jun. 2, 1999)
[Patent Literature 34]
Pamphlet of International Publication No. WO 1996/17884
[Patent Literature 35]
Pamphlet of International Publication No. WO 2012/156242
[Patent Literature 36]
Japanese Patent Application Publication Tokukaihei No. 10-251310 (Publication Date: Sep. 22, 1998)
[Patent Literature 37]
Japanese Translation of PCT Patent Application Publication, Tokuhyo, No. 2009-507117 (Publication Date: Feb. 19, 2009)

[Patent Literature 38]
Pamphlet of International Publication No. WO 2010/095427
[Patent Literature 39]
Japanese Translation of PCT Patent Application Publication, Tokuhyo, No. 2011-519381 (Publication Date: Jul. 7, 2011)
[Patent Literature 40]
Japanese Translation of PCT Patent Application Publication, Tokuhyo, No. 2002-538254 (Publication Date: Nov. 12, 2002)

Non-Patent Literature

[Non-Patent Literature 1]
Modern Superabsorbent Polymer Technology (1998), p. 69-117

SUMMARY OF INVENTION

Technical Problem

However, according to each of the conventional techniques described above, neither productivity nor water absorption performance was sufficiently improved even in a case where an additive and/or gas bubbles was/were introduced into an aqueous monomer solution. In addition, in a case where an increased in the amount additive and/or gas bubbles to be introduced was attempted, a reduction in productivity occurred as opposed to the desired effect and the additive would remain, so that problems of odor and safety arose.

For example, in a case where an additive is an internal crosslinking agent, various aspects were considered, such as controlling a length of time between addition of a dispersing agent or internal crosslinking agents differing in reaction mechanism and introduction of an internal crosslinking agent into a polymerization device. However, such problems arose that a new compound was necessary or that water absorption performance was not improved.

Furthermore, any additives other than internal crosslinking agents were considered for only a limited range of compounds, and, in many cases, were not effective for other compounds.

Under the circumstances, it is an object of the present invention to provide a method for producing, by adding an additive and/or gas bubbles to a monomer with high efficiency, a water-absorbing resin having high physical properties, particularly a polyacrylic acid (salt)-based water-absorbing resin having high physical properties, while high productivity is maintained.

Solution to Problem

As a result of diligent study to attain the object, the inventors of the present invention found that the above problems occur in a case where a certain additive is used. Then, the inventors of the present invention completed the present invention by further finding that a water-insoluble additive and/or gas bubbles, which is/are added to an aqueous monomer solution, become non-uniform over time and that the process of the water-insoluble additive and/or the gas bubbles becoming non-uniform stops when polymerization starts.

Specifically, a polyacrylic acid (salt)-based water-absorbing resin production method in accordance with the present invention is a method for producing a polyacrylic acid (salt)-based water-absorbing resin, including the steps of: preparing an aqueous monomer solution that is subjected to crosslinking and polymerization to produce a hydrogel-forming crosslinked polymer; polymerizing the aqueous monomer solution to obtain a hydrogel-forming crosslinked polymer; and drying the hydrogel-forming crosslinked polymer to obtain a dried polymer, wherein the step of preparing the aqueous monomer solution includes the steps of: (a) preparing an aqueous solution; and (b) adding a water-insoluble additive and/or gas bubbles, wherein a retention time from when the water-insoluble additive and/or the gas bubbles is/are added until a start time of the polymerization is 1 to 60 seconds in the step of adding the water-insoluble additive and/or gas bubbles.

Advantageous Effects of Invention

According to the present invention, a water-absorbing resin having high physical properties can be produced, while high productivity is maintained, by adding an additive and/or gas bubbles to a monomer with high efficiency.

DESCRIPTION OF EMBODIMENTS

The following description will discuss in detail a method in accordance with the present invention for producing a polyacrylic acid (salt)-based water-absorbing resin. The scope of the present invention is, however, not limited to this description. Besides the examples below, the present invention can also be modified as appropriate so as not to fail to attain the object of the present invention and put into practice. Specifically, the present invention is not limited to the description of the embodiments below, and can therefore be modified by a skilled person in the art within the scope of the claims. Any embodiment derived from a proper combination of technical means disclosed in different embodiments is also encompassed in the technical scope of the present invention.

[1] Definitions of Terms (1-1) "Water-Absorbing Resin"

The term "water-absorbing resin" as used in the present invention means a water-swelling and water-insoluble polymer gelatinizer that satisfies the following physical properties. Specifically, the term "water-absorbing resin" as used in the present invention means a polymer gelatinizer that satisfies physical properties of CRC defined as "water-swelling property" in ERT442.2-02 is equal to or more than 5 g/g and physical properties of Ext defined as "water-insoluble property" in ERT470.2-02 is equal to or less than 50 weight %.

The water-absorbing resin of the present invention is not limited to a mode in which the water-absorbing resin is a polymer in its entirety (100 weight %), and can be a water-absorbing resin composition containing an additive and/or the like, provided that the water-absorbing resin composition has the above physical properties (CRC and Ext).

The water-absorbing resin of the present invention may refer to not only an end product but also an intermediate produced during a process for producing the water-absorbing resin (e.g., a hydrogel-forming crosslinked polymer after polymerization, a dried polymer after drying, a water-absorbing resin powder before surface crosslinking, or the like), and all of these along with the water-absorbing resin composition are collectively referred to as the "water-absorbing resin". Note that examples of a form of the water-absorbing resin encompass those of a sheet, a fiber, a film, particles, and a gel. In the present invention, a water-absorbing resin in the form of particles is preferable.

(1-2) "Polyacrylic Acid (Salt)"

The term "polyacrylic acid (salt)" as used in the present invention refers to polyacrylic acid and/or a salt thereof, and means a polymer that contains, as a main component, a repeating unit of acrylic acid and/or a salt thereof (hereinafter referred to as "acrylic acid (salt)") and that contains a graft component as an optional component.

The term "main component" means that the acrylic acid (salt) is used (contained) in an amount normally of 50 mol % to 100 mol %, preferably of 70 mol % to 100 mol %, more preferably of 90 mol % to 100 mol %, and still more preferably of substantially 100 mol % per a total amount of monomers for use in polymerization (excluding an internal crosslinking agent).

(1-3) "EDANA" and "ERT"

The term "EDANA" is an abbreviation for the "European Disposables and Nonwovens Associations". The term "ERT" is an abbreviation for "EDANA Recommended Test Methods", which are European standard (de facto international standard) methods for measuring physical properties of water-absorbing resin. For the present invention, physical properties of water-absorbing resin are measured in conformity with the ERT master copy (revised in 2002; publicly known literature) unless otherwise specified.

(1-3-1) "CRC" (ERT441.2-02)

The term "CRC" is an abbreviation for "Centrifuge Retention Capacity", and means fluid retention capacity without pressure (hereinafter may be referred to as "fluid retention capacity") of the water-absorbing resin.

Specifically, CRC refers to a fluid retention capacity (unit: g/g) measured after 0.2 g of a water-absorbing resin contained in a nonwoven fabric bag is immersed in a large excess of 0.9 weight % of aqueous sodium chloride solution for 30 minutes so as to be allowed to freely swell, and then the water-absorbing resin is drained in a centrifuge (250 G).

(1-3-2) "AAP" (ERT442.2-02)

The term "AAP" is an abbreviation for "Absorption Against Pressure", and means a fluid retention capacity under pressure of a water-absorbing resin.

Specifically, AAP refers to a fluid retention capacity (unit: g/g) measured after 0.9 g of a water-absorbing resin is allowed to swell in a large excess of 0.9 weight % of aqueous sodium chloride solution for one hour under a load of 2.06 kPa (21 g/cm$^2$, 0.3 psi). Alternatively, AAP may be measured by replacing the above load with a load of 4.83 kPa (49 g/cm$^2$, 0.7 psi). Note that Absorption Under Pressure in ERT442.2-02 is substantially identical with AAP.

(1-3-3) "PSD" (ERT420.2-02)

The term "PSD" is an abbreviation for "Particle Size Distribution", and means a particle size distribution of a water-absorbing resin, which particle size distribution is measured by sieve classification.

Note that a weight average particle diameter (D50) and a logarithmic standard deviation (σζ) of a particle size distribution are measured according to a method similar to "(3) Mass-Average Particle Diameter (D50) and Logarithmic Standard Deviation (σζ) of Particle Diameter Distribution", which is a method disclosed in U.S. Pat. No. 7,638,570.

(1-3-4) "Ext" (ERT470.2-02)

The term "Ext" is an abbreviation for "Extractables", and means a water soluble component (water soluble component amount) of a water-absorbing resin.

Specifically, Ext refers to a dissolved polymer amount (unit: weight %) obtained by adding 1.0 g of a water-absorbing resin to 200 ml of 0.9 weight % of aqueous sodium chloride solution and stirring a resultant mixture at 500 rpm for 16 hours. Note that the dissolved polymer amount is measured by pH titration.

(1-3-5) "Moisture Content" (ERT430.2-02)

The term "Moisture Content" means a moisture content of a water-absorbing resin.

Specifically, the term "Moisture Content" refers to a value (unit: weight %) calculated from drying loss which is obtained in a case where 4.0 g of water-absorbing resin is dried at 105° C. for 3 hours. Note that in some cases, measurement may be carried out while the amount of the water-absorbing resin may be changed to 1.0 g and the drying temperature may be changed to 180° C.

(1-3-6) "Residual Monomers" (ERT410.2-02)

The term "Residual monomers" means the amount of monomers left in a water-absorbing resin (hereinafter referred to as "residual monomers").

Specifically, the term "Residual monomers" refers to a dissolved residual monomer amount (unit: ppm) obtained by adding 1.0 g of a water-absorbing resin to 200 ml of 0.9 weight % of aqueous sodium chloride solution and stirring a resultant mixture at 500 rpm for 1 hour. The dissolved residual monomer amount is measured by use of high-performance liquid chromatography (HPLC).

(1-4) "Water Absorption Speed"

"Water absorption speed" of the water-absorbing resin of the present invention means a water absorption speed measured by "FSR" (unit: g/g/s) or "Vortex" (unit: second). Note that the term "FSR" is an abbreviation for "Free Swell Rate". A specific method for measuring a water absorption speed will be described later in Examples.

(1-5) Other

The present specification assumes the following: Any range "X to Y" means a range from a value equal to or more than X to a value equal to or less than Y. Unless otherwise specified, the weight unit "t (ton)" refers to a metric ton, and "ppm" refers to ppm by weight or ppm by mass. The terms "weight" and "mass" are synonymous with each other, the terms "parts by weight" and "parts by mass" are synonymous with each other, and the terms "weight %" and "mass %" are synonymous with each other. The expression " . . . acid (salt)" means " . . . acid and/or a salt thereof", and the expression "(meth)acrylic" means "acrylic and/or methacrylic".

[2] Method for Producing Polyacrylic Acid (Salt)-Based Water-Absorbing Resin

The following description will discuss a polyacrylic acid (salt)-based water-absorbing resin production method in accordance with the present invention.

(2-1) Step of Preparing Aqueous Monomer Solution

This step is of preparing an aqueous monomer solution which becomes a hydrogel-forming crosslinked polymer by being subjected to crosslinking and polymerization. This step includes at least one of the following steps (a) through (c). To be more specific, according to the first invention, the step of preparing the aqueous monomer solution includes the following steps (a) and (b). Meanwhile, according to the second invention, the step of preparing the aqueous monomer solution includes all of the following steps (a) through (c). Note that it is alternatively possible to use slurry liquid of monomers, provided that water absorption performance of a water-absorbing resin to be obtained does not deteriorate. The present specification will discuss an aqueous monomer solution.

(a) Step of preparing an aqueous solution
(b) Step of adding a water-insoluble additive and/or gas bubbles
(c) Step of increasing a water content Note that the "aqueous solution" in the "(a) step of preparing the aqueous solution" means a liquid before addition of an water-insoluble additive and/or gas bubbles, examples of which water-insoluble additive encompass an internal crosslinking agent, a polymerization initiator, a reducing agent, a chain transfer agent, a foaming agent, a surfactant, a chelating agent, inorganic fine particles, and a polymer. Meanwhile, a liquid after addition of a raw material for a water-absorbing resin will be referred to as "aqueous monomer solution". Examples of the raw material encompass a water-soluble polymerization initiator. In other words, "aqueous monomer solution" means a liquid to which monomers and all the additives including polymerization initiators, that is, all the raw materials have been added and which is immediately before being subjected to polymerization.

Therefore, in the present invention, the "aqueous solution" and the "aqueous monomer solution" are distinguished from each other.

A liquid after addition of the water-insoluble additive and/or gas bubbles will be referred to as "mixed solution", and a liquid obtained through "(c) step of increasing a water content" will be referred to as "additional mixed solution" for convenience.

The "aqueous monomer solution" is a liquid containing an acrylic acid (salt) as a main component of monomers. The acrylic acid (salt) being the "main component" means that the acrylic acid (salt) is contained (used) in an amount of preferably equal to or more than 50 mol %, more preferably equal to or more than 70 mol %, and still more preferably equal to or more than 90 mol % (upper limit is 100 mol %) per a total amount of monomers (except for an internal crosslinking agent) to be used for a polymerization reaction for a water-absorbing resin.

(a) Step of Preparing Aqueous Solution

This step is of preparing a liquid before addition of an water-insoluble additive, examples of which encompass an internal crosslinking agent, a polymerization initiator a reducing agent, a chain transfer agent, a foaming agent, a surfactant, a chelating agent, inorganic fine particles, and a polymer. In this step, an aqueous solution of at least an acrylic acid (salt) is prepared.

Specifically, examples of the step of preparing the aqueous solution encompass mixing an acrylic acid (salt) and water, neutralizing an acrylic acid with the use of a basic composition, and purchasing and transporting an aqueous solution of acrylic acid (salt). Alternatively, it is possible to add a water-soluble additive. Specifically, it is possible to add a water-soluble additive, examples of which encompass an internal crosslinking agent, a polymerization initiator, a reducing agent, a chain transfer agent, a foaming agent, a surfactant, a chelating agent, inorganic fine particles, and a polymer. Note that a water-soluble additive herein refers to any additive except for the "water-insoluble additive" described later.

(Acrylic Acid (Salt))

In the present invention, an acrylic acid (salt) is used as monomer(s) from the viewpoint of physical properties of a water-absorbing resin to be obtained and from the viewpoint of productivity.

As the "acrylic acid", a well-known acrylic acid containing a trace component such as a polymerization inhibitor and/or impurities can be used. The polymerization inhibitor is not limited to any particular one, but is preferably of methoxyphenols, and more preferably of p-methoxyphenols. An amount of the polymerization inhibitor used is preferably equal to or less than 200 ppm, more preferably 10 ppm to 160 ppm, and still more preferably 20 ppm to 100 ppm from the viewpoint of polymerizability of an acrylic acid and from the viewpoint of color of a water-absorbing resin. With regard to impurities in the acrylic acid, a compound disclosed in U.S. Patent Application Publication No. 2008/0161512 can be applied to the present invention.

The "acrylic acid salt" is obtained by neutralizing the acrylic acid with the basic composition. Examples of the acrylic acid salt encompass a commercially available acrylic acid salt (e.g. sodium acrylate) and an acrylic acid salt obtained by neutralizing an acrylic acid in a production plant for water-absorbing resin.

(Basic Composition)

In the present invention, "basic composition" refers to a composition containing a basic compound, such as a commercially available aqueous sodium hydroxide solution.

Specific examples of the basic compound encompass a carbonate of alkali metal, a bicarbonate of alkali metal, a hydroxide of alkali metal, ammonia, and organic amine. Among these, the basic compound desirably has strong basicity from the viewpoint of physical properties of a water-absorbing resin to be obtained. That is, the basic compound is more preferably a hydroxide of alkali metal, such as sodium hydroxide, potassium hydroxide, and lithium hydroxide, and is more preferably sodium hydroxide.

(Neutralization)

In the present invention, an acrylic acid can be neutralized with the use of a basic composition so that an acrylic acid salt can be obtained. Note that the neutralization can be neutralization of an acrylic acid (before polymerization), neutralization of a hydrogel-forming crosslinked polymer to be obtained by crosslinking and polymerizing an acrylic acid (after polymerization) (hereinafter referred to as "later neutralization"), or a combination of the neutralization of an acrylic acid and the neutralization of a hydrogel-forming crosslinked polymer to be obtained by crosslinking and polymerizing an acrylic acid.

The neutralization is not limited to any particular type, and can be of a continuous type or a batch type. Among these, a continuous type is preferable from the viewpoint of production efficiency.

Note that with regard to conditions such as a neutralization apparatus, a neutralization temperature, and a retention time, the conditions disclosed in International Publication No. 2009/123197 and U.S. Patent Application Publication No. 2008/0194863 can be applied to the present invention.

A neutralization rate in the present invention is preferably 10 mol % to 90 mol %, more preferably 40 mol % to 85 mol %, still more preferably 50 mol % to 80 mol %, and particularly preferably 60 mol % to 75 mol % per an acid group of a monomer. In a case where the neutralization rate is less than 10 mol %, a fluid retention capacity may be lowered significantly. Meanwhile, in a case where the neutralization rate is higher than 90 mol %, it may not be possible to obtain a water-absorbing resin having a high fluid retention capacity under pressure.

The neutralization rate can also apply to the later neutralization. The neutralization rate can also apply to a neutralization rate for a water-absorbing resin which is an end product.

(Other Monomer(s))

According to the present invention, a water-absorbing resin can be produced by using, as "other monomer(s)", a compound disclosed in U.S. Patent Application Publication No. 2005/0215734 (except for an acrylic acid) in combination with the acrylic acid (salt). Note that examples of a water-absorbing resin to be obtained by the production method in accordance with the present invention encompass a water-absorbing resin in which a water-soluble or hydrophobic unsaturated monomer is a copolymerization component.

(Aqueous Solution)

In the present invention, a water content of an aqueous solution to be obtained by the step of preparing an aqueous solution is preferably equal to or more than 50 weight % and equal to or less than 80 weight %.

(b) Step of Adding Water-Insoluble Additive and/or Gas Bubbles

This step is of adding a water-insoluble additive and/or gas bubbles to the "aqueous solution" obtained in the (a) step of the preparing an aqueous solution, so that a mixed solution is obtained.

(Water-Insoluble Additive)

In the present invention, a "water-insoluble additive" refers to an additive having a solubility of preferably equal to or less than 10 g/l, more preferably equal to or less than 1 g/l, and still more preferably equal to or less than 0.1 g/l, in water at 25° C. Examples of the additive encompass compounds such as an internal crosslinking agent, a polymerization initiator, a reducing agent, a chain transfer agent, a foaming agent, a surfactant, a chelating agent, inorganic fine particles, and a polymer.

In the present invention, in a case where two or more of the additives are to be used in this step, it is only necessary that at least one additive is water-insoluble.

The additive is preferably at least one selected from an internal crosslinking agent, a polymerization initiator, a reducing agent, a chain transfer agent, a foaming agent, a surfactant, a chelating agent, inorganic fine particles, and a polymer. The additive is more preferably at least one selected from an internal crosslinking agent, a polymerization initiator, and a chelating agent. The additive is still more preferably water-insoluble chelating agent.

A solubility of the water-insoluble additive in 40 weight % of aqueous solution of an acrylic acid sodium salt at 25° C. (neutralization rate: 70 mol %) is preferably equal to or less than 10 g/l, more preferably equal to or less than 1 g/l, and still more preferably equal to or less than 0.1 g/l.

Even in a case where the water-insoluble additive is to be added to the aqueous solution, the use of a water-soluble additive is not eliminated. Alternatively, depending on an intended purpose, a water-insoluble additive and a water-soluble additive can be differentially used, or can be used in combination. That is, in a case where the water-insoluble additive is added to the aqueous solution in this step, a water-soluble additive can be added in the step of preparing the aqueous solution. Alternatively, a water-soluble additive and a water-insoluble additive can be used in combination in this step. Alternatively, a water-soluble additive can be added in the step of preparing the aqueous solution, and then a water-soluble additive and a water-insoluble additive can be used in combination in this step.

While a water-insoluble additive can be directly added to the aqueous solution without changing the form of the water-insoluble additive, it is preferable, from the viewpoint of ease of handling, to add the water-insoluble additive in the form of an acrylic acid solution or an acrylic acid dispersion.

If efficiency in adding a water-insoluble additive is poor, then it causes a problem of increasing cost due to an increase in an amount of water-insoluble additive used and causes a safety issue due to an increase in an amount of water-insoluble additive used. Meanwhile, the present invention brings about such a more remarkable effect as a reduction in the occurrence of the problems.

(Internal Crosslinking Agent)

The compounds disclosed in U.S. Pat. No. 6,241,928 can be used as an internal crosslinking agent usable in the present invention. One of the compounds or two or more of the compounds is/are to be selected in view of reactivity. From the viewpoint of water absorption performance and the like of a water-absorbing resin to be obtained, it is preferable to use, as an internal crosslinking agent, a compound having a (poly)alkylene glycol structural unit and two or more polymerizable unsaturated groups.

Preferable examples of the polymerizable unsaturated group encompass an allyl group and a (meth)acrylate group. More preferable examples of the polymerizable unsaturated group encompass a (meth)acrylate group. As the polyalkylene glycol structural unit, polyethylene glycol is preferable from the viewpoint of ease of handling. An n-number (average addition mole number of the oxyalkylene group) is preferably 1 to 100, and more preferably 6 to 50.

In view of desired thermal stability, it is possible to select structures between two or more polymerizable unsaturated groups. For example, as compared with a compound (such as polyalkylene glycol) containing an oxygen atom in a skeleton, polyhydric alcohol tends to be superior in thermal stability, which polyhydric alcohol does not contain an oxygen atom in a skeleton but has a hydroxyl group only at its end. Note that preferable examples of the polyhydric alcohol encompass C4-C10 diol (having 4 to 10 carbon atoms) and C4-C10 triol (in which two or three hydrogen atoms of hydrocarbon are substituted with a hydroxyl group).

Therefore, in a case where a water-insoluble internal crosslinking agent is used in the present invention, C4-C10 diol, C4-C10 triol, C4-C10 diallyl ether or triallyl ether, C4-C10 di(meth)acrylate, or C4-C10 tri(meth) acrylate is to be used.

An amount of the internal crosslinking agent used is preferably 0.0001 mol % to 10 mol %, and more preferably 0.001 mol % to 1 mol % per a total amount of monomers. In a case where the amount used falls within the above ranges, a desired water-absorbing resin can be obtained. Note that in a case where the amount used is excessively small, gel strength tends to lowered and consequently there tends to be an increase in water soluble component. In a case where the used amount is excessively large, fluid retention capacity tends to be lowered. Therefore, the amount used that is excessively large is not preferable.

According to the present invention, the following method is preferably used: An aqueous monomer solution, to which a certain amount of internal crosslinking agent has been added in advance, is prepared. Then, the aqueous monomer solution is simultaneously subjected to polymerization and to a crosslinking reaction. In particular, in a case where an internal crosslinking agent is a water-insoluble internal crosslinking agent, the present invention is preferably applied.

Alternatively, other than the above method, examples of a possible method encompass a method in which an internal crosslinking agent is added during or after polymerization, so that postcrosslinking is carried out, a method in which radical crosslinking is carried out with the use of a radical polymerization initiator, and a method in which radiation crosslinking is carried out with the use of active energy rays such as an electron ray and an ultraviolet ray. Alternatively, these methods can be used in combination.

(Chelating Agent)

The compound disclosed in International Publication No. 2011/040530 can be used as a chelating agent usable in the present invention.

In a case where a pyrolytic polymerization initiator (described later) is to be used, deterioration of polymerizability may be observed, due to iron ion contained in the basic composition described above. Therefore, a chelating agent is to be preferably used.

An amount of the chelating agent used is preferably equal to or less than 5 weight %, more preferably equal to or less than 1 weight %, still more preferably equal to or less than 0.5 weight %, and particularly preferably equal to or less than 0.1 weight % (lower limit: 0 weight %) per a total amount of monomers.

(Polymerization Initiator)

The compounds disclosed in U.S. Pat. No. 7,265,190 can be used as a polymerization initiator usable in the present invention. One of the compounds or two or more of the compounds is/are to be selected in view of a form of polymerization. Examples of the polymerization initiator encompass a pyrolytic polymerization initiator, a photodegradable polymerization initiator, and a redox polymerization initiator in which a reducing agent for promoting decomposition of any of these polymerization initiators is used in combination.

In the present invention, a water-soluble polymerization initiator is preferably used from the viewpoint of ease of handling a polymerization initiator and from the viewpoint of physical properties of a water-absorbing resin. The polymerization initiator can be preferably peroxide or an azo compound, more preferably peroxide, and still more preferably a persulfate. Note that any of these water-soluble polymerization initiators is preferably added immediately before being supplied to a polymerization device.

Meanwhile, a water-insoluble polymerization initiator can be preferably a photodegradable polymerization initiator, more preferably a phenone type photodegradable polymerization initiator, and still more preferably an alkylphenone type photodegradable polymerization initiator. Any of these water-insoluble polymerization initiators is preferably used in combination with the water-soluble polymerization initiator. In a case where a water-insoluble polymerization initiator is used in combination with a water-soluble polymerization initiator, the water-insoluble polymerization initiator and the water-soluble polymerization initiator can be added to the same part or differing parts, and are preferably added to differing parts. In other words, in a case where a water-insoluble polymerization initiator is used in combination with a water-soluble polymerization initiator, the water-insoluble polymerization initiator and the water-soluble polymerization initiator can be added at the same time point or at differing time points, and are preferably added at differing time points.

An amount of the polymerization initiator used is preferably 0.001 mol % to 1 mol %, and more preferably 0.001 mol % to 0.5 mol % per monomers. An amount of the reducing agent used is preferably 0.0001 mol % to 0.02 mol % per monomers.

In the present invention, a polymerization reaction can be made by, instead of using the polymerization initiator, irradiating a monomer with an active energy ray such as a radial ray, an electron ray, or an ultraviolet ray. Alternatively, any of these active energy rays can be used in combination with a polymerization initiator.

The polymerization initiator can be added to the aqueous solution and/or the mixed solution. Alternatively, the polymerization initiator can be added during polymerization. Alternatively, the polymerization initiator can be added to the aqueous solution and/or the mixed solution and during polymerization.

(Other Additives)

According to the present invention, from the viewpoint of improvement in physical properties of a water-absorbing resin to be obtained, a polymer can be added to the aqueous solution and/or the mixed solution. Examples of the polymer encompass starch, a starch derivative, cellulose, a cellulose derivative, polyvinyl alcohol, polyacrylic acid (salt), and crosslinked polyacrylic acid (salt) (particularly water-absorbing resin fine powder). Note that the polymer can be a water-soluble polymer or a water-insoluble polymer.

From the viewpoint of productivity and liquid permeability of a water-absorbing resin, a water-absorbing resin fine powder, which has been separated and recovered in a classification step, is preferably added to the aqueous solution and/or the mixed solution. Note that while a water-soluble or water-insoluble polymer can be directly added to the aqueous solution and/or the mixed solution without changing the form of the water-soluble or water-insoluble polymer, it is preferable, from the viewpoint of ease of handling, to add the water-soluble or water-insoluble polymer after dissolving or dispersing the water-soluble or water-insoluble polymer in a water-based liquid.

An amount of the polymer used is preferably equal to or less than 50 weight %, more preferably equal to or less than 20 weight %, still more preferably equal to or less than 10 weight %, and particularly preferably equal to or less than 5 weight % (lower limit: 0 weight %) per monomers.

In a case where the a water-soluble resin or a water-absorbing resin is used as the polymer, a graft polymer or a water-absorbing resin composition (e.g. a polymer produced from starch and an acrylic acid, a polymer produced from PVA and an acrylic acid, and the like) can be obtained. These polymers and water-absorbing resin compositions are also encompassed in the scope of the present invention.

In the present invention, from the viewpoint of a water absorption speed of a water-absorbing resin to be obtained, it is possible to add a foaming agent to the aqueous solution and/or the mixed solution. Examples of the foaming agent encompass a carbonate and an azo compound. Note that the foaming agent can be a water-soluble foaming agent or a water-insoluble foaming agent. From the viewpoint of a balance between water absorption speed and liquid permeability, a water-insoluble foaming agent is preferably an alkaline earth metal carbonate or an azo compound, more preferably an alkaline earth metal carbonate, and still more preferably a magnesium carbonate or a calcium carbonate.

In a case where the carbonate has excellent solubility in the aqueous solution and/or the mixed solution, the carbonate causes foaming in the aqueous solution and/or the mixed solution, or in an aqueous monomer solution. This allows a dissolved oxygen concentration to be lowered. Consequently, polymerizability improves. However, there is a risk that gas bubbles may disappear before the polymerization starts. Therefore, the carbonate is preferably used in combination with a surfactant described below.

Meanwhile, in a case where a water-insoluble foaming agent is to be used, the water-insoluble foaming agent has poor solubility in the aqueous solution and/or the mixed solution. Therefore, gas bubbles, which are generated in the aqueous solution and/or the mixed solution or in the aqueous monomer solution, do not disappear. This allows a porous water-absorbing resin to be obtained, and therefore allows a water absorption speed to be improved.

An amount of the foaming agent used is preferably equal to or less than 5 weight %, more preferably equal to or less than 1 weight %, still more preferably equal to or less than 0.5 weight %, and particularly preferably equal to or less than 0.1 weight % (lower limit: 0 weight %) per a total amount of monomers.

In the present invention, from the viewpoint of stabilizing gas bubbles and a water-insoluble additive, a surfactant can be added to the aqueous solution and/or the mixed solution. Note that the surfactant can be a water-soluble surfactant or a water-insoluble surfactant. From the viewpoint of water absorption speed, the surfactant is more preferably a water-insoluble surfactant. The surfactant, for example, has a hydrophobic group which is a hydrocarbon having preferably 6 or more carbon atoms and more preferably 10 to 20 carbon atoms and a hydrophilic group which is preferably nonionic or polyvalent metal salt.

An amount of the surfactant used is preferably equal to or less than 5 weight %, more preferably equal to or less than 1 weight %, still more preferably equal to or less than 0.5 weight %, and particularly preferably equal to or less than 0.1 weight % (lower limit: 0 weight %) per a total amount of monomers.

In the present invention, from the viewpoint of prevention of urine-based deterioration, a chain transfer agent can be added to the aqueous solution and/or the mixed solution. Note that the chain transfer agent can be a water-soluble chain transfer agent or a water-insoluble chain transfer agent.

An amount of the chain transfer agent used is preferably equal to or less than 5 weight %, more preferably equal to or less than 1 weight %, still more preferably equal to or less than 0.5 weight %, and particularly preferably equal to or less than 0.1 weight % (lower limit: 0 weight %) per a total amount of monomers.

(Gas Bubbles)

In the "(b) Step of adding a water-insoluble additive and/or gas bubbles" of the present invention, gas bubbles to be added are, from the viewpoint of polymerizability, preferably gas containing no oxygen, more preferably nitrogen and/or carbon dioxide, and still more preferably nitrogen.

From the viewpoint of improvement in a water absorption speed of a water-absorbing resin to be obtained, the gas bubbles may be preferably used in combination with the surfactant. This is because the presence of the surfactant allows the gas bubbles to be stabilized in an aqueous monomer solution, and therefore allows a porous water-absorbing resin to be obtained.

In a case where gas bubbles are to be used, a water-soluble additive can be alternatively used instead of the water-insoluble additive.

(Addition of Water-Insoluble Additive)

In the present invention, addition of the water-insoluble additive is not limited to any particular form, and can be carried out as described below.

In a case where one type of water-insoluble additive is to be added, the one type of water-insoluble additive can be added at once or over a plurality of times of addition. In a case where the one type of water-insoluble additive is added over a plurality of times of addition, a length of time between the first time of addition and the last time of addition is preferably equal to or less than 10 seconds, more preferably equal to or less than 5 seconds, and still more preferably equal to or less than 3 seconds. In a case where two or more types of water-insoluble additives are added, the two or more types of water-insoluble additives can be added at once or over a plurality of times of addition.

Furthermore, it is possible to carry out additional stirring, particularly forced stirring, after water-insoluble additives are combined in a pipe. In such a case, a length of time between a time point at which the water-insoluble additives are combined and a time point at which the additional stirring is carried out is preferably equal to or less than 10 seconds, more preferably equal to or less than 5 seconds, and still more preferably equal to or less than 3 seconds.

(Addition of Gas Bubbles)

In the present invention, addition of the gas bubbles is not limited to any particular form, and can be carried out as described below.

In a case where one type of gas bubbles is to be added, the one type of gas bubbles can be added at once or over a plurality of times of addition. In a case where the one type of gas bubbles is to be added over a plurality of times of addition, a length of time between the first time of addition and the last time of addition is preferably equal to or less than 10 seconds, more preferably equal to or less than 5 seconds, and still more preferably equal to or less than 3 seconds. In a case where two or more types of gas bubbles are to be added, the two or more types of gas bubbles can also be added at once or over a plurality of times of addition.

Furthermore, it is possible to carry out additional stirring, particularly forced stirring, after gas bubbles are combined in a pipe. In such a case, a length of time between a time point at which the gas bubbles are combined and a time point at which the additional stirring is carried out is preferably equal to or less than 10 seconds, more preferably equal to or less than 5 seconds, and still more preferably equal to or less than 3 seconds.

(Start Point of Step of Adding Water-Insoluble Additive and/or Gas Bubbles)

In the present invention, a start point of the step of adding a water-insoluble additive and/or gas bubbles is designated as a point at which the water-insoluble additive and/or the gas bubbles come(s) into contact with an aqueous solution for the first time. In other words, the start point of the step of adding the water-insoluble additive and/or the gas bubbles is a time point at which the water-insoluble additive and/or the gas bubbles come(s) into contact with an aqueous solution for the first time.

In a case where two or more types of water-insoluble additives are to be added independently of each other, it is possible to define start points of adding respective of the two or more types of water-insoluble additives. In a case where at least one type of water-insoluble additive and at least one type of gas bubbles are added independently of each other, it is possible to independently define a start point of adding the at least one type of water-insoluble additive and a start point of adding the at least one type of gas bubbles.

Therefore, a retention time (1) described later is to be defined for each of water-insoluble additive and gas bubbles.

(Stirring Reynolds Number)

In the present invention, from the viewpoint of evenly mixing the water-insoluble additive and/or the gas bubbles, it is preferable to, after adding a certain water-insoluble additive and/or certain gas bubbles to the aqueous solution, mix a resultant mixture. In so doing, for the purpose of the preventing the water-insoluble additive from being precipitated in a mixed solution, the stirring Reynolds number is preferably equal to or more than 1000, more preferably equal to or more than 2000, still more preferably equal to or more than 5000, and particularly preferably equal to or more than 10000.

The mixed solution is preferably stirred by forced stirring. The "forced stirring" refers to stirring with the use of motive power.

The mixed solution is supplied to a polymerization device after addition of a water-soluble polymerization initiator and/or another water-soluble additive(s) which may be added as necessary. In so doing, a pipe is to be used. The pipe is preferably provided with a mechanical stirring type line mixer, a static type line mixer, or the like. The pipe more preferably has a static type line mixer which requires no supplemental equipment such as that which provides stirring power. Specifically, the pipe more preferably has a stirring section, such as a static mixer, which does not use motive power. A static mixer in the pipe can be provided at one location, or static mixers can be provided at a plurality of locations. The static mixers can be connected in series or in parallel.

From the viewpoint of maintaining the stirring Reynolds number in the above ranges and from the viewpoint of preventing trouble during polymerization, an average speed at which to transmit a mixed solution in the pipe is preferably 0.1 m/s to 10 m/s, more preferably 0.2 m/s to 5 m/s, and still more preferably 0.3 m/s to 3 m/s.

(Temperature)

In the present invention, from the viewpoint of evenly mixing the water-insoluble additive and/or the gas bubbles, the water-insoluble additive and/or the gas bubbles are preferably added while a temperature of the aqueous solution is at a temperature preferably equal to or higher than 40° C., more preferably equal to or higher than 50° C., still more preferably equal to or higher than 60° C., and particularly preferably equal to or higher than 70° C. and an upper limit of the temperature is preferably equal to or less than a boiling point, and more preferably equal to or less than 100° C. Furthermore, it is preferable to carry out high-temperature-initiating polymerization (described later) while the temperature of the aqueous solution is maintained within the above ranges.

(Water Content)

In the present invention, a mixed solution obtained in the step of adding a water-insoluble additive and/or gas bubbles has a water content of preferably equal to or more than 50 weight % and equal to or less than 80 weight %. Note that in a case where the water content is less than 50 weight %, it is only necessary that an additional mixed solution to be obtained through the "step of increasing a water content" has a water content of equal to or more than 50 weight %.

Specifically, according to the polyacrylic acid (salt)-based water-absorbing resin production method (second invention) in accordance with the present invention, it is possible that a mixed solution to be obtained by the step of adding the water-insoluble additive and/or the gas bubbles has a water content of less than 50 weight % and that an additional mixed solution to be obtained through the step of increasing a water content has a water content of equal to or more than 50 weight %.

(c) Step of Increasing Water Content

This step is of increasing a water content of a mixed solution which has been obtained in the (b) step of adding water-insoluble additive and/or gas bubbles.

Specifically, this step is of neutralizing the mixed solution with the use of an aqueous solution of the basic composition. That is, this step is of neutralizing an acrylic acid (salt)-based mixed solution with the use of an alkali aqueous solution. Note that the water content of the mixed solution can be increased by water resulting from the aqueous solution of the basic composition and/or by water generated by a neutralization reaction.

Specifically, in the polyacrylic acid (salt)-based water-absorbing resin production method (second invention) in accordance with the present invention, the step of increasing a water content is preferably a step of neutralizing an acrylic acid (salt)-based mixed solution with the use of an alkali aqueous solution.

The neutralization can be carried out over a plurality of times. For example, in a case where the (b) step of adding a water-insoluble additive and/or gas bubbles is set between first neutralization and second neutralization, the second neutralization is this step.

In another aspect, in a case where a water-soluble polymerization initiator and another water-soluble additive are to be added to the mixed solution, a water content of the mixed solution can be increased by adding these additives as water-based liquids.

In a case where this step is carried out, an additional mixed solution is to have a water content of preferably equal to or more than 50 weight %, more preferably equal to or more than 52 weight %, and still more preferably equal to or more than 55 weight %.

(Monomer Component Concentration)

In the present invention, after a raw material of a water-absorbing resin, such as a water-soluble polymerization initiator, is added, an aqueous monomer solution has a monomer component concentration of, although not particularly limited, preferably less than 50 weight %, more preferably less than 48 weight %, and still more preferably less than 45 weight %, from the viewpoint of water absorption performance of the water-absorbing resin. Meanwhile, from the viewpoint of productivity, the monomer component concentration is preferably equal to or more than 10 weight %, more preferably equal to or more than 20 weight %, still more preferably equal to or more than 30 weight %, and particularly preferably equal to or more than 40 weight %.

In a case where aqueous solution polymerization or reverse phase suspension polymerization is to be carried out, solvents other than water can be used in combination as necessary. In such a case, a type of the solvent is not limited to any particular one.

Note that the "monomer component concentration" is a value that can be obtained by the following Formula (1). A weight of an aqueous monomer solution does not include weights of a graft component, a water-absorbing resin, and/or a hydrophobic solvent used in reverse phase suspension polymerization.

[Math. 1]

$$\text{Monomer component concentration (weight \%)} = (\text{weight of monomer component})/(\text{weight of aqueous monomer solution}) \times 100 \quad (1)$$

(2-2) Polymerization Step

This step is of polymerizing an acrylic acid (salt)-based aqueous monomer solution obtained in the step of preparing the aqueous monomer solution, so that a hydrogel-forming crosslinked polymer (hereinafter referred to as "hydrogel") is obtained.

(Retention Time)

According to the present invention (first invention), a retention time (1), which is defined as a length of time from when a water-insoluble additive and/or gas bubbles is/are added in the step of adding the water-insoluble additive and/or the gas bubbles to when polymerization starts in the polymerization step, is controlled to be 1 second to 60 seconds, preferably 1 second to 50 seconds, more preferably 1 second to 40 seconds, and still more preferably 1 second to 30 seconds.

Specifically, a polyacrylic acid (salt)-based water-absorbing resin production method (first invention) in accordance with the present invention is a method for producing a polyacrylic acid (salt)-based water-absorbing resin, comprising the steps of: (A) preparing an aqueous monomer solution which becomes a hydrogel-forming crosslinked polymer by being subjected to crosslinking and polymerization; (B) polymerizing the aqueous monomer solution, so as to obtain a hydrogel-forming crosslinked polymer; and (C) drying the hydrogel-forming crosslinked polymer, so as to obtain a dried polymer, the method including the steps of (a) preparing an aqueous solution and (b) adding a water-insoluble additive and/or gas bubbles, and a retention time (1) from when the water-insoluble additive and/or the gas bubbles is/are added in the step (b) to when polymerization starts in the step (B) being 1 second to 60 seconds.

Note that in a case where two or more types of water-insoluble additives are used or where at least one type of water-insoluble additive and at least one type of gas bubbles are used, the retention time (1) regarding the at least one type of water-insoluble additive or the at least one type of gas bubbles falls within the above range, and preferably the retention time (1) regarding all of the water-insoluble additive and/or gas bubbles falls within the above range. Water-insoluble additive and/or gas bubbles, which has a retention time (1) falling within the above range, can bring about such an effect of the present invention as improving efficiency with which water-insoluble additive and/or gas bubbles are added.

According to another method of the present invention (second invention), a retention time (2), which is defined as a length of time from when a water-based liquid is added in the step of increasing a water content to when polymerization starts in the polymerization step, is controlled to be 1 second to 60 seconds, preferably 1 second to 50 seconds, more preferably 1 second to 40 seconds, and still more preferably 1 second to 30 seconds.

Specifically, a polyacrylic acid (salt)-based water-absorbing resin production method (second invention) in accordance with the present invention is a method for producing a polyacrylic acid (salt)-based water-absorbing resin, comprising the steps of: (A) preparing an aqueous monomer solution which becomes a hydrogel-forming crosslinked polymer by being subjected to crosslinking and polymerization; (B) polymerizing the aqueous monomer solution, so as to obtain a hydrogel-forming crosslinked polymer; and (C) drying the hydrogel-forming crosslinked polymer, so as to obtain a dried polymer, the method further including the steps of (a) preparing an aqueous solution, (b) adding a water-insoluble additive and/or gas bubbles, and (c) increasing a water content, and a retention time (2) from when a water-based liquid is added in the step (c) to when polymerization starts in the step (B) being 1 second to 60 seconds.

Note that in a case where two or more types of water-insoluble additives are used or where at least one type of water-insoluble additive and at least one type of gas bubbles are used, the retention time (2) regarding the at least one type of water-insoluble additive or the at least one type of gas bubbles falls within the above range, and preferably the retention time (2) regarding all of the water-insoluble additive and/or gas bubbles falls within the above range. Water-insoluble additive and/or gas bubbles, which has a retention time (2) falling within the above range, can bring about such an effect of the present invention as improving efficiency with which water-insoluble additive and/or gas bubbles are added.

Note that the "when a water-insoluble additive and/or gas bubbles is/are added" refers to a time point at which the water-insoluble additive and/or the gas bubbles comes(s) into contact with an aqueous solution, and that "when a water-based liquid is added" refers to a time point at which the water-based liquid comes into contact with a mixed solution.

Note also that the "when polymerization starts" refers to a time point at which a rise in a temperature of an aqueous monomer solution due to heat of polymerization starts, and particularly refers to a time point at which the rise in the temperature by equal to or higher than 0.5° C. is recognized. Note also that in a case where continuous polymerization is carried out, measuring a temperature of an aqueous monomer solution at a plurality of certain locations makes it possible to identify when polymerization starts. Note that the temperature of the aqueous monomer solution is preferably measured with the use of a non-contact thermometer. In a case where high-temperature-initiating polymerization described below is carried out, foaming which occurs due to water vapor generated by heat of polymerization may start immediately after a temperature rises.

In a case where a continuous kneader polymerization is used, a particulate hydrogel, which is generated in a continuous kneader polymerization device, may be pushed to flow in a direction opposite of an overall traveling direction of a product (such a phenomenon is called "back-mixing"). This may cause an aqueous monomer solution and the particulate hydrogel to coexist at a time point defined as "when polymerization starts" in the present invention. In such a case, a temperature "when polymerization starts" is preferably measured by measuring a temperature of a liquid surface. In a case where it is difficult to measure the temperature of the liquid surface, such a situation can be dealt with as necessary by, for example, measuring viscosity of an aqueous monomer solution. That is, in the case where measuring the temperature of the liquid surface is difficult, a time point, at which an increase in viscosity of an aqueous monomer solution starts due to polymerization, is defined as when polymerization starts.

(Form of Polymerization)

Polymerization to be applied to the present invention is not limited to any particular form. From the viewpoint of a water absorbent property, ease of control of polymerization, and the like, preferable examples of the polymerization encompass vapor phase spray polymerization, vapor phase droplet polymerization, aqueous solution polymerization, and reverse phase suspension polymerization, more preferable examples of the polymerization encompass aqueous solution polymerization and reverse phase suspension polymerization, and still more preferable examples of the polymerization encompass aqueous solution polymerization. Among these, continuous aqueous solution polymerization is particularly preferable. The continuous aqueous solution polymerization can be any one of continuous belt polymerization and continuous kneader polymerization.

Specific examples of the form of continuous belt polymerization encompass those disclosed in U.S. Pat. No. 4,893,999, U.S. Pat. No. 6,241,928, and U.S. Patent Application Publication No. 2005/0215734. Specific examples of the form of continuous kneader polymerization encompass those disclosed in U.S. Pat. No. 6,987,151 and U.S. Pat. No. 6,710,141. In a case where these forms of continuous aqueous solution polymerization are employed, it is possible to improve efficiency with which a water-absorbing resin is produced.

Preferable examples of the form of the continuous aqueous solution polymerization encompass "high-temperature-initiating polymerization" and "high-concentration polymerization". The "high-temperature-initiating polymerization" is a form of polymerization in which polymerization is started while a temperature of an aqueous monomer solution is preferably equal to or higher than 40° C., more preferably equal to or higher than 50° C., still more preferably equal to or higher than 60° C., and particularly preferably equal to or higher than 70° C. (upper limit: boiling point). The "high-concentration polymerization" is a form of polymerization in which polymerization is carried out while a monomer concentration is preferably equal to or more than 30 weight %, more preferably equal to or more than 35 weight %, still more preferably equal to or more than 40 weight %, and particularly preferably equal to or more than 42 weight % (upper limit: saturating concentration). Alternatively, it is possible to use these forms of polymerization in combination.

In the present invention, polymerization can be carried out in an air atmosphere. From the viewpoint of color of a water-absorbing resin to be obtained, polymerization is to be carried out preferably in an atmosphere of inert gas such as nitrogen or argon. In such a case, an oxygen concentration is preferably controlled to be, for example, equal to or less than 1 volume %. Note that dissolved oxygen in an aqueous monomer solution is also preferably substituted with inert gas (e.g. dissolved oxygen: less than 1 mg/l).

In the present invention, alternatively, it is possible to carry out foaming polymerization in which polymerization is carried out by dispersing gas bubbles (particularly the inert gas or the like) into an aqueous monomer solution.

In the present invention, alternatively, it is possible to increase a solid content concentration during polymerization. A degree of increase in solid content as an index of an increase in such a solid content concentration can be defined by the following Formula (2). Note that the degree of increase in solid content concentration is preferably equal to or more than 1 weight %, and more preferably equal to or more than 2 weight %.

[Math. 2]

$$\text{Degree (weight \%) of increase in solid content} = \text{(solid content concentration in hydrogel after polymerization)} - \text{(solid content concentration in aqueous monomer solution)} \quad (2)$$

Where the solid content concentration in an aqueous monomer solution is a value that can be obtained by the following Formula (3) and where components in a polymerization system are an aqueous monomer solution, a graft component, a water-absorbing resin and other solid matters (e.g. water-insoluble fine particles and the like), and therefore exclude a hydrophobic solvent in reverse phase suspension polymerization.

[Math. 3]

$$\text{Solid content concentration (weight \%) in aqueous monomer solution} = \{\text{weight of (monomer component+graft component+water-absorbing resin+other solid matters)}\}/\text{(weight of components in polymerization system)} \times 100 \quad (3)$$

(2-3) Gel-Crushing Step

This step is a step of gel-crushing a hydrogel, which has been obtained by the polymerization step, with use of, for example, a kneader, a screw extruder such as a meat chopper, or a gel-crusher such as a cutter mill in order to obtain a hydrogel in the form of particles (hereinafter referred to as "particulate hydrogel"). In a case where the polymerization step is carried out through kneader polymerization, such a step is equivalent to a combination of the polymerization step and the gel-crushing step which are carried out simultaneously. In a case where a particulate hydrogel is directly obtained through a polymerization process such as vapor phase polymerization or reverse phase suspension polymerization, the gel-crushing step may not be carried out.

With regard to gel-crushing conditions and forms other than above described, contents disclosed in International Publication No. 2011/126079 can be preferably applied to the present invention.

(2-4) Drying Step

This step is a step of drying the hydrogel, which has been obtained by the polymerization step and/or the gel-crushing step, to a desired resin solid content, so as to obtain a dried polymer. The resin solid content is a value determined from a drying loss (that is, a weight change caused in a case where 1 g of a water-absorbing resin has been heated at 180° C. for 3 hours). The resin solid content is preferably equal to or more than 80 weight %, more preferably 85 weight % to 99 weight %, still more preferably 90 weight % to 98 weight %, and particularly preferably 92 weight % to 97 weight %.

A drying method for drying the particulate hydrogel is not limited to a particular one and can be, for example, drying by heating, hot air drying, drying under reduced pressure, drying with a fluidized bed, infrared drying, microwave drying, drying with a drum dryer, drying by azeotropic dehydration with a hydrophobic organic solvent, high humidity drying with hot moisture vapor, or the like. Among these, from the viewpoint of drying efficiency, the hot air drying is preferable, and band drying is more preferable in which hot air drying is carried out on a through-flow belt.

From the viewpoint of color and drying efficiency of the water-absorbing resin, a drying temperature in the hot air drying (i.e., a temperature of hot air) is preferably 120° C. to 250° C., and more preferably 150° C. to 200° C. Note that drying conditions other than the drying temperature, i.e., an air velocity of hot air, a drying time, and the like can be set as appropriate according to a moisture content and a total weight of a particulate hydrogel to be dried and an intended resin solid content. In a case where the band drying is carried out, conditions which are disclosed in International Publication No. 2006/100300, International Publication No.

2011/025012, International Publication No. 2011/025013, International Publication No. 2011/111657, and the like can be applied as appropriate.

By setting the drying temperature and the drying time to fall within the above ranges, it is possible to cause the water-absorbing resin to be obtained to have a CRC (fluid retention capacity), Ext (water soluble component), and a color which fall within desired range (see [3] below).

(2-5) Crushing Step, Classification Step

These steps are steps of obtaining water-absorbing resin powder (for convenience, a water-absorbing resin which is in the form of powder and is before being subjected to surface cross-linking is referred to as "water-absorbing resin powder") by crushing the dried polymer which has been obtained in the drying step (crushing step), and adjusting the obtained crushed dried polymer so that the obtained crushed dried polymer has a particle size falling within a predetermined range (classification step).

Examples of an apparatus used in the crushing step of the present invention encompass high-speed crushers such as a roll mill, a hammer mill, a screw mill, and a pin mill; a vibrating mill; a knuckle-type crusher; a cylindrical mixer; and the like, and these apparatuses are used in combination according to need.

A particle size adjusting method in the classification step of the present invention is not limited to a particular one and can be, for example, sieve classification with use of a JIS standard sieve (JIS Z8801-1 (2000)), airflow classification, or the like. Note that the particle size adjustment of water-absorbing resin is not limitedly carried out in the crushing step and the classification step and can be carried out, as appropriate, in the polymerization step (particularly, in reverse phase suspension polymerization or spray drop polymerization) or another step (e.g., a granulation step or a fine powder recovery step).

The water-absorbing resin powder obtained in the present invention has a weight average particle diameter (D50) preferably of 200 μm to 600 μm, more preferably of 200 μm to 550 μm, still more preferably of 250 μm to 500 μm, and particularly preferably of 350 μm to 450 μm. A ratio of particles having a particle diameter of less than 150 μm is preferably equal to or less than 10 weight %, more preferably equal to or less than 5 weight %, and still more preferably equal to or less than 1 weight %, and a ratio of particles having a particle diameter of equal to or more than 850 μm is preferably equal to or less than 5 weight %, more preferably equal to or less than 3 weight %, and still more preferably equal to or less than 1 weight %. A lower limit of each of the ratios of such particles is preferably as low as possible and is desirably 0 weight %. Note, however, that a lower limit of each of the ratios of such particles can be approximately 0.1 weight %. Further, a logarithmic standard deviation (σζ) of the particle size distribution is preferably 0.20 to 0.50, more preferably 0.25 to 0.40, and still more preferably 0.27 to 0.35. Note that each of those particle sizes is measured with use of a standard sieve in conformity to a measuring method disclosed in U.S. Pat. No. 7,638,570 or EDANA ERT420.2-02.

The particle size above described can be applied not only to the water-absorbing resin after surface cross-linking (hereinafter, for convenience, sometimes referred to as "water-absorbing resin particles") but also to a water-absorbing resin which is an end product. Therefore, it is preferable to carry out surface-crosslinking treatment (surface-crosslinking step) so that the particle size falling within the above described range is maintained in the water-absorbing resin particles, and it is more preferable to carry out particle size adjustment by carrying out a sizing step subsequent to the surface-crosslinking step.

(2-6) Surface-Crosslinking Step

This step is a step of causing a part of a surface layer of water-absorbing resin powder obtained through the above steps (i.e., a part up to several tens of micrometers deep from a surface of the water-absorbing resin powder) to have a higher crosslinking density. The surface-crosslinking step is made up of a mixing step, a heating treatment step, and a cooling step (optional).

In the surface-crosslinking step, a water-absorbing resin (water-absorbing resin particles) can be obtained which has been surface cross-linked by radical crosslinking on the surface of the water-absorbing resin powder, surface polymerization, cross-linking reaction with a surface-crosslinking agent, or the like.

(Surface-Crosslinking Agent)

A surface-crosslinking agent usable in the present invention is not particularly limited and can be any of organic or inorganic surface-crosslinking agents. Among these surface-crosslinking agents, an organic surface-crosslinking agent which reacts with a carboxyl group is preferably employed from the viewpoint of physical properties of a water-absorbing resin and ease of handling of a surface-crosslinking agent. For example, the surface-crosslinking agent can be one surface-crosslinking agent or two or more surface-crosslinking agents which are disclosed in U.S. Pat. No. 7,183,456. Specifically, examples of the surface-crosslinking agent encompass a polyhydric alcohol compound, an epoxy compound, a haloepoxy compound, a polyhydric amine compound, a condensed product with a haloepoxy compound of the polyhydric amine compound, an oxazoline compound, an oxazolidinone compound, a polyvalent metal salt, an alkylene carbonate compound, a cyclic urea compound, and the like.

An amount of the surface-crosslinking agent used (or a total amount used in a case where a plurality of surface-crosslinking agents are used) is preferably 0.01 parts by weight to 10 parts by weight, more preferably 0.01 parts by weight to 5 parts by weight per 100 parts by weight of the water-absorbing resin powder. The surface-crosslinking agent is preferably added as an aqueous solution. In such a case, an amount of water used is preferably 0.1 parts by weight to 20 parts by weight, more preferably 0.5 parts by weight to 10 parts by weight per 100 parts by weight of the water-absorbing resin powder. In a case where a hydrophilic organic solvent is used according to need, an amount of the hydrophilic organic solvent used is preferably equal to or less than 10 parts by weight, and more preferably equal to or less than 5 parts by weight per 100 parts by weight of the water-absorbing resin powder.

It is possible to mix additives, which are added in a "remoistening step" described below, with the surface-crosslinking agent (aqueous solution) by adding each of the additives in a range of equal to or less than 5 parts by weight. Alternatively, it is possible to add the additives to the water-absorbing resin powder and the surface-crosslinking agent in a mixing step described below.

(Mixing Step)

This step is a step of mixing the water-absorbing resin powder and the surface-crosslinking agent. A method of mixing the surface-crosslinking agent is not limited to a particular one and can be a method in which a surface-crosslinking agent solution is prepared in advance, and the surface-crosslinking agent solution is mixed with the water-absorbing resin powder preferably by spraying or dropping the surface-crosslinking agent solution onto the water-absorbing resin powder, more preferably by spraying the surface-crosslinking agent solution onto the water-absorbing resin powder.

An apparatus for carrying out the mixing is not limited to a particular one and is preferably a high-speed stirring-type mixing apparatus, and more preferably a high-speed stirring-type continuous mixing apparatus.

(Heating Treatment Step)

This step is a step of heating a mixture, which has been obtained in the mixing step, so as to cause cross-linking reaction on a surface of the water-absorbing resin powder.

An apparatus for causing the cross-linking reaction is not limited to a particular one and can be preferably a paddle dryer. A reaction temperature in the cross-linking reaction is set as appropriate according to a type of a used surface-crosslinking agent, and is preferably 50° C. to 300° C., and more preferably 100° C. to 200° C.

(Cooling Step)

This step is an optional step which is carried out after the heating treatment step if needed.

An apparatus for carrying out the cooling is not limited to a particular one and is preferably an apparatus whose specification is identical with that of an apparatus used in the heating treatment step, and more preferably a paddle dryer. This is because such an apparatus can be used as a cooling apparatus by changing a heating medium to a cooling medium. Note that, according to need, the water-absorbing resin particles obtained in the heating treatment step are force-cooled in the cooling step to a temperature preferably of 40° C. to 80° C., and more preferably of 50° C. to 70° C.

(2-7) Remoistening Step

This step is a step of adding, to the water-absorbing resin particles obtained in the surface-crosslinking step, at least one additive selected from the group consisting of a polyvalent metal salt compound, a polycationic polymer, a chelating agent, an inorganic reducing agent, and a hydroxycarboxylic acid compound which are described below.

Note that the additive is added in the form of aqueous solution or slurry liquid, and therefore the water-absorbing resin particles are swollen by water again. Therefore, this step is referred to as "remoistening step". Moreover, as early described, the additive can be mixed with the water-absorbing resin powder simultaneously with the surface-crosslinking agent (aqueous solution).

(Polyvalent Metal Salt and/or Cationic Polymer)

In the present invention, from the viewpoint of improvement in water absorption speed, liquid permeability, fluidity during moisture absorption, and the like of the water-absorbing resin to be obtained, it is preferable to add a polyvalent metal salt and/or a cationic polymer.

Specifically, as the polyvalent metal salt and/or the cationic polymer, a compound and an amount used thereof disclosed in "[7] Polyvalent metal salt and/or cationic polymer" of International Publication No. 2011/040530 can be applied to the present invention.

(Chelating Agent)

In the present invention, from the viewpoint of color (coloring prevention), deterioration prevention, and the like in the water-absorbing resin to be obtained, it is preferable to add a chelating agent.

Specifically, as the chelating agent, a compound and an amount used thereof disclosed in "[2] Chelating agent" of International Publication No. 2011/040530 can be applied to the present invention.

(Inorganic Reducing Agent)

In the present invention, from the viewpoint of color (coloring prevention), deterioration prevention, reduction in residual monomer, and the like in the water-absorbing resin to be obtained, it is preferable to add an inorganic reducing agent.

Specifically, as the inorganic reducing agent, a compound and an amount used thereof disclosed in "[3] Inorganic reducing agent" of International Publication No. 2011/040530 can be applied to the present invention.

($\alpha$-Hydroxycarboxylic Acid Compound)

In the present invention, from the viewpoint of color (coloring prevention) and the like in the water-absorbing resin to be obtained, it is preferable to add an $\alpha$-hydroxycarboxylic acid compound. Note that the "$\alpha$-hydroxycarboxylic acid compound" is carboxylic acid having a hydroxyl group in a molecule or is a salt thereof, and is hydroxycarboxylic acid having a hydroxyl group at an alpha position.

Specifically, as the $\alpha$-hydroxycarboxylic acid compound, a compound and an amount used thereof disclosed in "[6] $\alpha$-hydroxycarboxylic acid compound" of International Publication No. 2011/040530 can be applied to the present invention.

(2-8) Step of Adding Another Additive

In the present invention, an additive other than the above described additives can be added in order to give various functions to the water-absorbing resin. Specifically, examples of such an additive encompass a surfactant, a compound having a phosphorus atom, an oxidizer, an organic reducing agent, water-insoluble inorganic fine particles, organic powder such as metallic soap, a deodorant agent, an antibacterial agent, pulp, thermoplastic fibers, and the like. Note that, as the surfactant, a compound disclosed in International Publication No. 2005/075070 can be applied to the present invention. Moreover, as the water-insoluble inorganic fine particles, a compound disclosed in "[5] Water-insoluble inorganic fine particles" of International Publication No. 2011/040530 can be applied to the present invention.

An amount of the additive used (added) is determined as appropriate according to a purpose of use of the water-absorbing resin to be obtained and is therefore not limited to a particular one. The amount used (added) of the additive is preferably equal to or less than 3 parts by weight, and more preferably equal to or less than 1 part by weight per 100 parts by weight of the water-absorbing resin powder. The additive can be added during any of the processes for producing the polyacrylic acid (salt)-based water-absorbing resin.

(2-9) Other Steps

In the present invention, in addition to the above described steps, it is possible to carry out a granulation step, a sizing step, a fine powder removal step, a fine powder recycling step, and the like according to need. Moreover, it is possible to further carry out one or two or more of a transporting step, a storing step, a packing step, a reserving step, and the like. Note that the "sizing step" includes a step of carrying out classification and crushing in the fine powder removal step subsequent to the surface-crosslinking step and a step of carrying out classification and crushing in a case where a water-absorbing resin is aggregated to have a size larger than an intended size. The "fine powder recycling step" encompasses an aspect in which fine powder itself is added as in the present invention and also a step of causing fine powder to be a large hydrogel and adding the hydrogel during any of the processes for producing the water-absorbing resin.

[3] Physical Properties of Polyacrylic Acid (Salt)-Based Water-Absorbing Resin

In a case where the polyacrylic acid (salt)-based water-absorbing resin obtained by the production method in accordance with the present invention is used in a sanitary material, particularly in a disposable diaper, it is preferable that at least one of physical properties described in (3-1) through (3-10) below, preferably two or more of the physical properties including an AAP, more preferably three or more of the physical properties including the AAP, most preferably all the physical properties, are controlled to fall within desired ranges. This is because, in a case where the physical properties satisfy the ranges described below, the effect of the present invention can be sufficiently brought about, and a sufficient function is achieved in a high-concentration disposable diaper.

The polyacrylic acid (salt)-based water-absorbing resin obtained by the production method in accordance with the present invention is not particularly limited in its shape but is preferably in the form of particles. In this section, physical properties are described in regard to a water-absorbing resin which is of a preferable aspect, i.e., in the form of particles. Note that the physical properties below are measured in conformity to an EDANA method, unless otherwise specified.

(3-1) CRC (Fluid Retention Capacity without Pressure)

CRC (fluid retention capacity without pressure) of the water-absorbing resin of the present invention is normally equal to or more than 5 g/g, preferably equal to or more than 15 g/g, and more preferably equal to or more than 25 g/g. An upper limit of the CRC is not particularly limited, and is preferably as high as possible. However, from the viewpoint of balance with the other physical properties, the CRC is preferably equal to or less than 70 g/g, more preferably equal to or less than 50 g/g, and still more preferably equal to or less than 40 g/g.

In a case where the CRC is equal to or more than 5 g/g, an amount of a liquid to be absorbed by the water-absorbing resin is increased, and therefore the water-absorbing resin suitably serves as an absorbent body in a sanitary material such as a disposable diaper. In a case where the CRC is equal to or less than 70 g/g, a rate of absorbing a body fluid or the like such as urine or blood does not decrease, and therefore the water-absorbing resin is suitably used in a high-speed water absorbing disposable diaper or the like. Note that the CRC can be controlled with use of an internal crosslinking agent, a surface-crosslinking agent, and/or the like.

(3-2) AAP (Fluid Retention Capacity Under Pressure)

AAP (fluid retention capacity under pressure) of the water-absorbing resin of the present invention is preferably equal to or more than 20 g/g, more preferably equal to or more than 22 g/g, still more preferably equal to or more than 23 g/g, particularly preferably equal to or more than 24 g/g, and most preferably equal to or more than 25 g/g. An upper limit of the AAP is not particularly limited but is preferably equal to or less than 30 g/g.

In a case where the AAP is equal to or more than 20 g/g, an amount of return (normally, referred to as "re-wet") of a liquid, which return is caused by pressure applied to an absorbent body, does not become excessively large, and therefore the water-absorbing resin can be suitably used as an absorbent body of a sanitary material such as a disposable diaper. Note that the AAP can be controlled by adjusting a particle size or with use of a surface-crosslinking agent, or the like.

(3-3) Particle Size (Particle Size Distribution, Weight Average Particle Diameter (D50), Logarithmic Standard Deviation ($\sigma\zeta$) of the Particle Size Distribution)

A particle size (a particle size distribution, a weight average particle diameter (D50), a logarithmic standard deviation ($\sigma\zeta$) of the particle size distribution) of the water-absorbing resin of the present invention is controlled to be identical with a particle size of water-absorbing resin powder which has not been subjected to surface cross-linking.

(3-4) Ext (Water Soluble Component)

Ext (water soluble component) of the water-absorbing resin of the present invention is normally equal to or less than 50 weight %, preferably equal to or less than 35 weight %, more preferably equal to or less than 25 weight %, and still more preferably equal to or less than 15 weight %. A lower limit of Ext is not particularly limited but is preferably 0 weight %, and more preferably approximately 0.1 weight %.

In a case where the Ext is equal to or less than 50 weight %, a gel strength does not become lower, and the water-absorbing resin has an excellent liquid permeability. Further, re-wet is small, and therefore the water-absorbing resin is suitably used as an absorbent body of a sanitary material such as a disposable diaper. Note that the Ext can be controlled with use of an internal crosslinking agent or the like.

(3-5) Moisture Content

A moisture content of the water-absorbing resin of the present invention is preferably more than 0 weight % and equal to or less than 15 weight %, more preferably 1 weight % to 13 weight %, still more preferably 2 weight % to 10 weight %, and particularly preferably 2 weight % to 9 weight %.

In a case where the moisture content falls within the above range, it is possible to obtain a water-absorbing resin that is excellent in powder characteristics (e.g., fluidity, transportability, damage resistance, and the like).

(3-6) Residual Monomer

A residual monomer contained in the water-absorbing resin of the present invention is, from the viewpoint of safety, preferably equal to or less than 500 ppm, more preferably equal to or less than 400 ppm, and still more preferably equal to or less than 300 ppm. A lower limit is not particularly limited but is preferably 0 ppm, and more preferably approximately 10 ppm.

In a case where the contained amount of the residual monomer falls within the above range, it is possible to obtain a water-absorbing resin which less applies a stimulus to skin of a human body or the like.

(3-7) SFC (Saline Flow Conductivity)

SFC (saline flow conductivity) of the water-absorbing resin of the present invention is preferably equal to or more than 50 ($\times 10^{-7} \cdot cm^3 \cdot s \cdot g^{-1}$), more preferably equal to or more than 60 ($\times 10^{-7} \cdot cm^3 \cdot s \cdot g^{-1}$), still more preferably equal to or more than 70 ($\times 10^{-7} \cdot cm^3 \cdot s \cdot g^{-1}$), and particularly preferably equal to or more than 80 ($\times 10^{-7} \cdot cm^3 \cdot s \cdot g^{-1}$). An upper limit of SFC is not particularly limited but is preferably equal to or less than 3000 ($\times 10^{-7} \cdot cm^3 \cdot s \cdot g^{-1}$), and more preferably equal to or less than 2000 ($\times 10^{-7} \cdot cm^3 \cdot s \cdot g^{-1}$).

In a case where the SFC is equal to or more than 50 ($\times 10^{-7} \cdot cm^3 \cdot s \cdot g^{-1}$), a liquid permeability with respect to a body fluid or the like such as urine or blood is not low, and therefore the water-absorbing resin can be suitably used as an absorbent body of a sanitary material such as a disposable diaper. Moreover, in a case where the SFC is equal to or less than 3000 ($\times 10^{-7} \cdot cm^3 \cdot s \cdot g^{-1}$), a body fluid or the like such as urine or blood is sufficiently absorbed and leakage of liquid does not occur. Therefore, the water-absorbing resin can be suitably used as an absorbent body of a sanitary material such as a disposable diaper. Note that the SFC can be controlled by adjusting a particle size or with use of a surface-crosslinking agent, a polyvalent metal salt, a cationic polymer, or the like.

(3-8) FSR (Water Absorption Speed)

FSR (water absorption speed) of the water-absorbing resin of the present invention is preferably equal to or more than 0.10 g/g/s, more preferably equal to or more than 0.15 g/g/s, still more preferably equal to or more than 0.20 g/g/s, and particularly preferably equal to or more than 0.25 g/g/s. An upper limit of FSR is not particularly limited but is preferably equal to or less than 5.0 g/g/s, more preferably equal to or less than 3.0 g/g/s.

In a case where the FSR is equal to or more than 0.10 g/g/s, a body fluid or the like such as urine or blood is sufficiently absorbed and leakage of liquid does not occur. Therefore, the water-absorbing resin can be suitably used as an absorbent body of a sanitary material such as a disposable diaper. Note that the FSR can be controlled by carrying out foaming polymerization, by adjusting a particle size, and/or the like.

(3-9) Initial Color

An initial color of the water-absorbing resin of the present invention is, in terms of an L value in the Hunter's Lab color system, preferably equal to or more than 88, more preferably equal to or more than 89, and still more preferably equal to or more than 90. An upper limit of the initial color is 100, and no problem occurs by a color as long as the initial color is at least 88. Moreover, a value a is preferably −3 to 3, more preferably −2 to 2, and still more preferably −1 to 1. Further, a value b is preferably 0 to 12, more preferably 0 to 10, still more preferably 0 to 9. Note that whiteness increases as the L value approaches 100, and a color becomes paler (i.e., becomes substantially white) as the value a and the value b approach 0.

(3-10) Color with Lapse of Time

A color with a lapse of time of the water-absorbing resin of the present invention is, in terms of an L value in the Hunter's Lab color system, preferably equal to or more than 80, more preferably equal to or more than 81, still more preferably equal to or more than 82, and particularly preferably equal to or more than 83. An upper limit of the color with the lapse of time is 100, and no problem occurs by a color as long as the color with the lapse of time is at least 80. Moreover, a value a is preferably −3 to 3, more preferably −2 to 2, and still more preferably −1 to 1. Further, a value b is preferably 0 to 15, more preferably 0 to 12, and still more preferably 0 to 10. Note that whiteness increases as the L value approaches 100, and a color becomes paler (i.e., becomes substantially white) as the value a and the value b approach 0.

[4] Application of Polyacrylic Acid (Salt)-Based Water-Absorbing Resin

An application of the water-absorbing resin of the present invention is not limited to a particular one, and the water-absorbing resin is preferably used as an absorbent body in sanitary materials such as disposable diapers, sanitary napkins, and incontinence pads. In particular, the water-absorbing resin can be used as an absorbent body in high-concentration disposable diapers (i.e., disposable diapers each of which contains a large amount of the water-absorbing resin) having problems such as odor derived from a raw material and coloring. Further, in a case where the water-absorbing resin is used as an upper layer part of the absorbent body, a significant effect can be expected.

Alternatively, as the absorbent body, it is possible to use an absorbent material such as a pulp fiber, in addition to the water-absorbing resin. In such a case, an amount (core concentration) of the water-absorbing resin contained in the absorbent body is preferably 30 weight % to 100 weight %, more preferably 40 weight % to 100 weight %, still more preferably 50 weight % to 100 weight %, further still more preferably 60 weight % to 100 weight %, particularly preferably 70 weight % to 100 weight %, and most preferably 75 weight % to 95 weight %.

In a case where the core concentration falls within the above range and the absorbent body is used as an upper layer part of an absorbent article, the absorbent article can maintain cleanness, i.e., a state of being white. Further, in such a case, the absorbent article is excellent in diffusion property with respect to a body fluid or the like such as urine or blood, and therefore improvement in absorption amount can be expected based on efficient liquid distribution.

EXAMPLES

The following Examples and Comparative Examples will more specifically describe the present invention. The present invention should not be narrowly interpreted within the limits of those Examples. A proper combination of technical means disclosed in Examples is encompassed in the scope of the present invention.

Unless otherwise specified, an electrical apparatus (including an apparatus used to measure physical properties of the water-absorbing resin) used in Examples and Comparative Examples uses a 200-volt or 100-volt power supply, and measures the physical properties of the water-absorbing resin of the present invention at a room temperature (in a range from 20° C. to 25° C.) and at a relative humidity of 50% RH±10%.

For convenience, "liter" is sometimes abbreviated as "l" or "L", and "weight %" is sometimes abbreviated as "wt %". Further, in measurement of a trace component, a value equal to or less than a detection limit is represented by "N.D" (Non Detected).

[Measurement of Physical Properties of Water-Absorbing Resin]

(a) CRC (Fluid Retention Capacity without Pressure)

The CRC (fluid retention capacity without pressure) of the water-absorbing resin of the present invention was measured in conformity to the EDANA method (ERT441.2-02).

(b) AAP (Fluid Retention Capacity Under Pressure)

The AAP (fluid retention capacity under pressure) of the water-absorbing resin of the present invention was measured in conformity to the EDANA method (ERT442.2-02). Note that a load condition was changed to 4.83 kPa (0.7 psi).

(c) Particle Size (Particle Size Distribution, Weight Average Particle Diameter (D50), Logarithmic Standard Deviation ($\sigma\zeta$) of the Particle Size Distribution)

The particle size (particle size distribution, weight average particle diameter (D50), logarithmic standard deviation ($\sigma\zeta$) of the particle size distribution) of the water-absorbing resin of the present invention was measured in conformity to "(3) Mass-Average Particle Diameter (D50) and Logarithmic Standard Deviation ($\sigma\zeta$) of Particle Diameter Distribution" disclosed in columns 27 and 28 of U.S. Pat. No. 7,638,570.

(d) Ext (Water Soluble Component)

The Ext (water soluble component) of the water-absorbing resin of the present invention was measured in conformity to the EDANA method (ERT470.2-02).

(e) Moisture Content, Resin Solid Content

The moisture content of the water-absorbing resin of the present invention was measured in conformity to the EDANA method (ERT430.2-02). Note that, in the measurement of the present invention, a sample amount was changed to 1.0 g, and a drying temperature was changed to 180° C.

Note that the resin solid content (weight %) was defined by (100−moisture content) (weight %).

(f) Residual Monomer

The residual monomer contained in the water-absorbing resin of the present invention was measured in conformity to the EDANA method (ERT410.2-02).

Note that, together with the residual monomer, a residual crosslinking agent having a UV absorption property and other impurities having a UV absorption property were also measured.

(g) SFC (Saline Flow Conductivity)

The SFC (saline flow conductivity) of the water-absorbing resin of the present invention was measured in conformity to the measuring method disclosed in U.S. Pat. No. 5,669,894.

(h) FSR (Water Absorption Speed)

The FSR (water absorption speed) of the water-absorbing resin of the present invention was measured in conformity to the measuring method disclosed in International Publication No. 2011/078298.

(i) Initial Color and Color with Lapse of Time

The initial color and the color with the lapse of time of the water-absorbing resin of the present invention were measured in conformity to the measuring method disclosed in International Publication No. 2011/040530.

(j) Degradable Soluble Component

The degradable soluble component of the water-absorbing resin of the present invention was measured with the following method.

That is, L-ascorbic acid was added to 0.9 weight % of aqueous sodium chloride solution prepared in advance, so that a degradation test liquid containing 0.05 weight % of L-ascorbic acid was created. Specifically, 0.5 g of L-ascorbic acid was dissolved in 999.5 g of a physiological saline, and thus 1000.0 g of a degradation test liquid was prepared.

Then, 200 ml of the degradation test liquid was added to a 250-ml polypropylene cup having a lid, and 1.0 g of the water-absorbing resin powder was added to the degradation test liquid to form a swollen gel. The container was lidded to be sealed, and the swollen gel was statically left in an atmosphere at 60° C. for two hours. Two hours later, a cylindrical stirrer having a length of 30 mm and a thickness of 8 mm was put into the swollen gel, and the swollen gel was stirred for one hour with a method similar to the above method (for Ext (water soluble component)). Thus, degraded soluble components were extracted from the hydrogel.

After the extraction by the one-hour stirring, the degraded soluble components were filtered with a method identical with the method for the above described (d) water soluble component amount, pH titration was carried out, and a degradable soluble component (unit: weight %) by the degradation test liquid was calculated with the same calculation formula.

Example 1

Acrylic acid, 48 weight % of aqueous sodium hydroxide solution, and ion exchange water were continuously mixed, and thus an aqueous solution (1) in which a concentration of sodium acrylate was 43 weight % and a neutralization rate was 75 mol % and which was at a temperature of 95° C. was continuously prepared. Note that the acrylic acid contained 70 ppm of p-methoxyphenol.

Subsequently, 0.060 g/s of 1 weight % of aqueous diethylene triamine pentaacetate pentasodium solution as a chelating agent and 0.176 g/s of 20 weight % of aqueous polyethyleneglycol diacrylate solution as an internal crosslinking agent were added to 27.8 g/s of the aqueous solution (1). Simultaneously, 10 ml/s of nitrogen was blown in and mixed by forced stirring (stirring Reynolds number; 50000) with an in-line mixer, and thus a mixed solution (1) was obtained. Note that an average molecular weight of the polyethyleneglycol diacrylate was 523, and an added amount of the polyethyleneglycol diacrylate was 0.05 mol % per a monomer.

Next, the mixed solution (1) was transferred via a pipe. In so doing, the mixed solution (1) was stirred with use of a static mixer that was provided in the pipe at a downstream side end of the pipe and, immediately after that, 0.535 g/s of 3 weight % of aqueous sodium persulfate solution was added as a polymerization initiator and line mixing was carried out. Thus, an aqueous monomer solution (1) was obtained. Note that sodium persulfate had a formula weight of 238, and an added amount of the sodium persulfate was 0.05 mol % per a monomer.

Subsequently, the aqueous monomer solution (1) was supplied to a continuous belt polymerization device with use of a supplying nozzle having a length of 0.5 m. Note that stirring Reynolds numbers were as follows: that is, 1500 in the pipe before (upstream) of the static mixer; 5000 in the static mixer; and 3000 in the supplying nozzle. Moreover, a monomer concentration of the aqueous monomer solution (1) was 42 weight %, a neutralization rate of the aqueous monomer solution (1) was 75 mol %, and a supplied amount of the aqueous monomer solution (1) to the continuous belt polymerization device was 28.5 g/s.

The continuous belt polymerization device is a polymerizer having an effective length of 2 m that is defined by a length from the supplying nozzle for supplying an aqueous monomer solution to a part from which a hydrogel is discharged. The belt is an endless belt which has a surface coated with a silicone resin, and a transferring speed (running speed) was set to 1 cm/s.

A temperature (solution temperature) of the aqueous monomer solution (1) which had been supplied to the continuous belt polymerization device was measured with use of an infrared thermometer, and the temperature was 90° C. in the vicinity of an outlet of the supplying nozzle. Moreover, a rise in the temperature was confirmed at a point which was 15 cm downstream from the outlet of the supplying nozzle. This showed that polymerization started at the point. Immediately after that, the hydrogel was swollen while generating water vapor and was then shrunk approximately 60 seconds later. By the above operations, a belt-like hydrogel (1) was obtained.

Note that a retention time from when the nitrogen was added to when the aqueous monomer solution (1) was supplied to the continuous belt polymerization device was 15 seconds, and a retention time from when the aqueous monomer solution (1) was supplied to the continuous belt polymerization device to when the polymerization started was 15 seconds (15 cm÷1 cm/s). That is, a total retention time from when the nitrogen was added to when the polymerization started was 30 seconds.

The belt-like hydrogel (1) which had been obtained was subjected to gel-crushing with use of a meat chopper (18 mm in die pore diameter), and thus a particulate hydrogel (1) was obtained. Then, the particulate hydrogel (1) was dried in a stationary hot air dryer (manufactured by Satake Chemical Equipment Mfg Ltd.; Type 71-6S) at a temperature of 180° C. for 30 minutes, and thus a dried polymer (1) was obtained. Note that, in the drying, the particulate hydrogel (1) was placed with a thickness of 5 cm on a metal gauze having a length of 30 cm and a breadth of 20 cm.

Then, the dried polymer (1) was subjected to crushing with use of a roll mill, and was classified with use of JIS standard sieves having respective mesh sizes of 850 μm and 150 μm. Thus, water-absorbing resin powder (1) was obtained which had a particle diameter of equal to or larger than 150 μm and smaller than 850 μm.

The water-absorbing resin powder (1) thus obtained had a weight average particle diameter (D50) of 380 μm, a moisture content of 5 weight %, a CRC of 38 g/g, an Ext of 10 weight %, a residual monomer of 450 ppm, and a FSR of 0.23 g/g/s.

Comparative Example 1

Comparative water-absorbing resin powder (1) was obtained by carrying out operations similar to Example 1, except that a length of the pipe up to the point where the aqueous sodium persulfate solution was added was extended in a state of being subjected to heat-retention. Note that the static mixer was provided immediately before addition of the aqueous sodium persulfate solution.

In Comparative Example 1, a retention time from when nitrogen was added to when the aqueous monomer solution (1) was supplied to the continuous belt polymerization device was 100 seconds. Moreover, the temperature rise in the polymerization step was confirmed at a point 15 cm downstream from the outlet of the supplying nozzle for supplying the aqueous monomer solution, and therefore a retention time from when the aqueous monomer solution (1) was supplied to the continuous belt polymerization device to when the polymerization started was 15 seconds (15 cm÷1 cm/s). That is, a total retention time from when the nitrogen was added to when the polymerization started was 115 seconds.

The comparative water-absorbing resin powder (1) thus obtained had a weight average particle diameter (D50) of 380 μm, a moisture content of 5 weight %, a CRC of 38 g/g, an Ext of 10 weight %, a residual monomer of 450 ppm, and a FSR of 0.21 g/g/s.

It was confirmed that the FSR of the water-absorbing resin powder was improved by employing the method (addition of the nitrogen) of the present invention.

Example 2

Water-absorbing resin powder (2) was obtained by carrying out operations similar to Example 1, except that the internal crosslinking agent was changed to 0.060 g/s of a 20 weight % trimethylolpropane triacrylate acrylic acid solution. Note that the trimethylolpropane triacrylate had a molecular weight of 296 and a solubility of 0.046 g/l in water at 25° C., and an added amount of the trimethylolpropane triacrylate was 0.03 mol % per a monomer.

The aqueous monomer solution (2) had a monomer concentration of 42 weight % and a neutralization rate of 75 mol %, and a supplied amount of the aqueous monomer solution (2) to the continuous belt polymerization device was 28.4 g/s.

In Example 2, a retention time from when the internal crosslinking agent and the nitrogen were added to when the aqueous monomer solution (2) was supplied to the continuous belt polymerization device was 15 seconds. Moreover, a temperature rise in the polymerization step was confirmed at a point 15 cm downstream from the outlet of the supplying nozzle for supplying the aqueous monomer solution, and therefore a retention time from when the aqueous monomer solution (2) was supplied to the continuous belt polymerization device to when the polymerization started was 15 seconds (15 cm÷1 cm/s). That is, a total retention time from when the internal crosslinking agent and the nitrogen were added to when the polymerization started was 30 seconds.

The water-absorbing resin powder (2) thus obtained had a weight average particle diameter (D50) of 380 μm, a moisture content of 5 weight %, a CRC of 38 g/g, an Ext of 10 weight %, a residual monomer of 450 ppm, and a FSR of 0.24 g/g/s. Moreover, no residual internal crosslinking agent was detected (detection limit; less than 1 ppm).

Comparative Example 2

Comparative water-absorbing resin powder (2) was obtained by carrying out operations similar to Example 2, except that a length of the pipe up to the point where the aqueous sodium persulfate solution was added was extended in a state of being subjected to heat-retention, as with Comparative Example 1. Note that the static mixer was provided immediately before addition of the aqueous sodium persulfate solution.

In Comparative Example 2, a retention time from when the internal crosslinking agent and the nitrogen were added to when the aqueous monomer solution (2) was supplied to the continuous belt polymerization device was 100 seconds.

Moreover, a temperature rise in the polymerization step was confirmed at a point 15 cm downstream from the outlet of the supplying nozzle for supplying the aqueous monomer solution, and therefore a retention time from when the aqueous monomer solution (2) was supplied to the continuous belt polymerization device to when the polymerization started was 15 seconds (15 cm÷1 cm/s). That is, a total retention time from when the internal crosslinking agent and the nitrogen were added to when the polymerization started was 115 seconds.

The comparative water-absorbing resin powder (2) thus obtained had a weight average particle diameter (D50) of 380 μm, a moisture content of 5 weight %, a CRC of 39 g/g, an Ext of 12 weight %, a residual monomer of 450 ppm, a FSR of 0.21 g/g/s, and a residual internal crosslinking agent of 4 ppm.

It was confirmed that the Ext of the water-absorbing resin powder was improved by employing the method (use of the water-insoluble internal crosslinking agent and addition of the nitrogen) of the present invention. Note that the water-absorbing resin in which the water-insoluble internal crosslinking agent was used had a higher thermal stability.

Example 3

Water-absorbing resin powder (3) was obtained by carrying out operations similar to Example 1, except that the chelating agent was changed to 0.060 g/s of a 20 weight % β-thujapricin acrylic acid solution. Note that the β-thujapricin had a solubility of 1 g/l in water at 25° C., and an added amount of the β-thujapricin was 1000 ppm per a monomer.

The aqueous monomer solution (3) had a monomer concentration of 42 weight % and a neutralization rate of 75 mol %, and a supplied amount of the aqueous monomer solution (3) to the continuous belt polymerization device was 28.5 g/s.

In Example 3, a retention time from when the chelating agent and the nitrogen were added to when the aqueous monomer solution (3) was supplied to the continuous belt polymerization device was 15 seconds. Moreover, a temperature rise in the polymerization step was confirmed at a point 15 cm downstream from the outlet of the supplying nozzle for supplying the aqueous monomer solution, and therefore a retention time from when the aqueous monomer solution (3) was supplied to the continuous belt polymerization device to when the polymerization started was 15 seconds (15 cm÷1 cm/s). That is, a total retention time from when the chelating agent and the nitrogen were added to when the polymerization started was 30 seconds.

The water-absorbing resin powder (3) thus obtained had a weight average particle diameter (D50) of 380 μm, a moisture content of 5 weight %, a CRC of 38 g/g, an Ext of 10 weight %, a residual monomer of 450 ppm, and a FSR of 0.24 g/g/s.

Subsequently, a surface-crosslinking agent solution containing 0.3 parts by weight of ethylene carbonate, 0.5 parts by weight of propylene glycol, and 3 parts by weight of ion exchange water was evenly mixed with 100 parts by weight of the water-absorbing resin powder (3), and heating treatment was carried out in an oven at 200° C. for 40 minutes. Then, a resultant product was caused to pass through a JIS standard sieve having a mesh size of 850 μm, and thus a water-absorbing resin (3) was obtained. Table 1 indicates physical properties of the water-absorbing resin (3).

Comparative Example 3

Comparative water-absorbing resin powder (3) was obtained by carrying out operations similar to Example 3, except that a length of the pipe up to the point where the aqueous sodium persulfate solution was added was extended in a state of being subjected to heat-retention, as with Comparative Example 1. Note that the static mixer was provided immediately before addition of the aqueous sodium persulfate solution.

In Comparative Example 3, a retention time from when the chelating agent and the nitrogen were added to when the aqueous monomer solution (3) was supplied to the continuous belt polymerization device was 100 seconds. Moreover, a temperature rise in the polymerization step was confirmed at a point 25 cm downstream from the outlet of the supplying nozzle for supplying the aqueous monomer solution, and therefore a retention time from when the aqueous monomer solution (3) was supplied to the continuous belt polymerization device to when the polymerization started was 25 seconds (25 cm÷1 cm/s). That is, a total retention time from when the chelating agent and the nitrogen were added to when the polymerization started was 125 seconds.

The comparative water-absorbing resin powder (3) thus obtained had a weight average particle diameter (D50) of 380 μm, a moisture content of 5 weight %, a CRC of 39 g/g, an Ext of 12 weight %, a residual monomer of 450 ppm, and a FSR of 0.21 g/g/s.

Subsequently, a comparative water-absorbing resin (3) was obtained by carrying out surface cross-linking similar to that of Example 3 with respect to the comparative water-absorbing resin powder (3). Table 1 indicates physical properties of the comparative water-absorbing resin (3).

TABLE 1

| | | CRC [g/g] | Degradable soluble component [wt %] |
|---|---|---|---|
| Example 3 | Water-absorbing resin (3) | 30 | 15 |
| Comparative Example 3 | Comparative water-absorbing resin (3) | 31 | 23 |

The chelating agent has an effect of restricting a degradable soluble component and, from results of Example 3 and Comparative Example 3, it was found that efficiency in adding the chelating agent was improved by the method of the present invention.

Example 4

Water-absorbing resin powder (4) was obtained by carrying out operations similar to Example 1, except that 0.069 g/s of a 1 weight % 1-hydroxycyclohexylphenylketone acrylic acid solution was concurrently added, as the water-insoluble photodegradable polymerization initiator, together with the chelating agent and the internal crosslinking agent and that a UV lamp was provided in the vicinity of a hydrogel outlet of the continuous belt polymerization device. Note that the 1-hydroxycyclohexylphenylketone had a molecular weight of 204 and a solubility of 0.1 g/l in water at 25° C., and an added amount of the 1-hydroxycyclohexylphenylketone was 0.025 mol % per a monomer.

The aqueous monomer solution (4) had a monomer concentration of 42 weight % and a neutralization rate of 75 mol %, and a supplied amount of the aqueous monomer solution (4) to the continuous belt polymerization device was 28.6 g/s.

In Example 4, a retention time from when the photodegradable polymerization initiator and the nitrogen were added to when the aqueous monomer solution (4) was supplied to the continuous belt polymerization device was seconds. Moreover, a temperature rise in the polymerization step was confirmed at a point 15 cm downstream from the outlet of the supplying nozzle for supplying the aqueous monomer solution, and therefore a retention time from when the aqueous monomer solution (4) was supplied to the continuous belt polymerization device to when the polymerization started was 15 seconds (15 cm÷1 cm/s). That is, a total retention time from when the photodegradable polymerization initiator and the nitrogen were added to when the polymerization started was 30 seconds.

The water-absorbing resin powder (4) thus obtained had a weight average particle diameter (D50) of 380 µm, a moisture content of 5 weight %, a CRC of 38 g/g, an Ext of 10 weight %, a residual monomer of 350 ppm, and a FSR of 0.24 g/g/s.

Comparative Example 4

Comparative water-absorbing resin powder (4) was obtained by carrying out operations similar to Example 4, except that a length of the pipe up to the point where the aqueous sodium persulfate solution was added was extended in a state of being subjected to heat-retention, as with Comparative Example 1. Note that the static mixer was provided immediately before addition of the aqueous sodium persulfate solution.

In Comparative Example 4, a retention time from when the photodegradable polymerization initiator and the nitrogen were added to when the aqueous monomer solution (4) was supplied to the continuous belt polymerization device was 100 seconds. Moreover, a temperature rise in the polymerization step was confirmed at a point 15 cm downstream from the outlet of the supplying nozzle for supplying the aqueous monomer solution, and therefore a retention time from when the aqueous monomer solution (4) was supplied to the continuous belt polymerization device to when the polymerization started was 15 seconds (15 cm÷1 cm/s). That is, a total retention time from when the photodegradable polymerization initiator and the nitrogen were added to when the polymerization started was 115 seconds.

The comparative water-absorbing resin powder (4) thus obtained had a weight average particle diameter (D50) of 380 µm, a moisture content of 5 weight %, a CRC of 38 g/g, an Ext of 10 weight %, a residual monomer of 390 ppm, and a FSR of 0.21 g/g/s.

It was confirmed that a reduction in the residual monomer of the water-absorbing resin powder was improved by employing the method (use of the water-insoluble polymerization initiator and addition of the nitrogen) of the present invention.

Example 5

Water-absorbing resin powder (5) was obtained by carrying out operations similar to Example 1, except that the internal crosslinking agent was changed to 0.060 g/s of 20 weight % of trimethylolpropane triacrylate acrylic acid solution and the chelating agent was changed to 0.10 g/s of 10 weight % of ρ-thujapricin acrylic acid solution, that 0.069 g/s of 1 weight % of 1-hydroxycyclohexylphenylketone acrylic acid solution was concurrently added, as a water-insoluble polymerization initiator, together with the chelating agent and the internal crosslinking agent, and that a UV lamp was provided in the vicinity of the hydrogel outlet of the continuous belt polymerization device.

Note that the trimethylolpropane triacrylate had a molecular weight of 296 and a solubility of 0.046 g/l in water at 25° C., and an added amount of the trimethylolpropane triacrylate was 0.03 mol % per a monomer. The β-thujapricin had a solubility of 1 g/l in water at 25° C., and an added amount of the β-thujapricin was 800 ppm per a monomer. Further, the 1-hydroxycyclohexylphenylketone has a molecular weight of 204 and a solubility of 0.1 g/l in water at 25° C., and an added amount of the 1-hydroxycyclohexylphenylketone was 0.025 mol % per a monomer.

The aqueous monomer solution (5) had a monomer concentration of 42 weight % and a neutralization rate of 74 mol %, and a supplied amount of the aqueous monomer solution (5) to the continuous belt polymerization device was 28.5 g/s.

In Example 5, a retention time from when the internal crosslinking agent, the chelating agent, the photodegradable polymerization initiator, and the nitrogen were added to when the aqueous monomer solution (5) was supplied to the continuous belt polymerization device was seconds. Moreover, a temperature rise in the polymerization step was confirmed at a point 15 cm downstream from the outlet of the supplying nozzle for supplying the aqueous monomer solution, and therefore a retention time from when the aqueous monomer solution (5) was supplied to the continuous belt polymerization device to when the polymerization started was 15 seconds (15 cm÷1 cm/s). That is, a total retention time from when the internal crosslinking agent, the chelating agent, the photodegradable polymerization initiator, and the nitrogen were added to when the polymerization started was 30 seconds.

The water-absorbing resin powder (5) thus obtained had a weight average particle diameter (D50) of 380 µm, a moisture content of 5 weight %, a CRC of 38 g/g, an Ext of 10 weight %, a residual monomer of 350 ppm, and a FSR of 0.24 g/g/s.

Subsequently, a water-absorbing resin (5) was obtained by carrying out surface cross-linking similar to that of Example 3 with respect to the water-absorbing resin powder (5). The water-absorbing resin (5) thus obtained had a CRC of 29 g/g and contained 13 weight % of a degradable soluble component.

Comparative Example 5

Comparative water-absorbing resin powder (5) was obtained by carrying out operations similar to Example 1, except that no nitrogen was used.

In Comparative Example 5, a temperature rise in the polymerization step was confirmed at a point 20 cm downstream from the outlet of the supplying nozzle for supplying the aqueous monomer solution. Therefore, a retention time from when the comparative aqueous monomer solution (5) was supplied to the continuous belt polymerization device to when the polymerization started was 20 seconds (20 cm÷1 cm/s).

The comparative water-absorbing resin powder (5) thus obtained had a weight average particle diameter (D50) of 380 µm, a moisture content of 5 weight %, a CRC of 39 g/g, an Ext of 11 weight %, a residual monomer of 470 ppm, and a FSR of 0.21 g/g/s.

Reference Example 1

Acrylic acid, 48 weight % of aqueous sodium hydroxide solution, and ion exchange water were continuously mixed, and thus an aqueous solution (6) in which a concentration of sodium acrylate was 51 weight % and a neutralization rate was 36 mol % and which was at a temperature of 60° C. was continuously prepared. Note that the acrylic acid contained 70 ppm of p-methoxyphenol.

Subsequently, 0.060 g/s of 1 weight % of aqueous diethylene triamine pentaacetate pentasodium solution as a chelating agent and 0.060 g/s of 20 weight % of trimethylolpropane triacrylate acrylic acid solution as an internal crosslinking agent were simultaneously added to 23.4 g/s of the aqueous solution (6), and then mixed by forced stirring (stirring Reynolds number; 50000) with use of an in-line mixer. Thus, a mixed solution (6) was obtained. Note that the trimethylolpropane triacrylate had a molecular weight of 296 and a solubility of 0.046 g/l in water at 25° C., and an added amount of the trimethylolpropane triacrylate was 0.03 mol % per a monomer.

After that, 4.38 g/s of 48 weight % of aqueous sodium hydroxide solution was added to and mixed with the mixed solution (6) while carrying out forced stirring (stirring Reynolds number; 50000) with use of another in-line mixer. Thus, an additional mixed solution (6) was obtained.

Subsequently, the additional mixed solution (6) was transferred via a pipe. In so doing, the additional mixed solution (6) was stirred with use of a static mixer that was provided in the pipe at a downstream side end of the pipe and, immediately after that, 0.535 g/s of 3 weight % of aqueous sodium persulfate solution was added as a polymerization initiator and line mixing was carried out. Thus, an aqueous monomer solution (6) was obtained. Note that sodium persulfate had a formula weight of 238, and an added amount of the sodium persulfate was 0.05 mol % per a monomer.

Subsequently, the aqueous monomer solution (6) was supplied to a continuous belt polymerization device with use of a supplying nozzle having a length of 0.5 m. Note that stirring Reynolds numbers were as follows: that is, 1500 in the pipe before (upstream) of the static mixer; 5000 in the static mixer; and 3000 in the supplying nozzle. Moreover, the aqueous monomer solution (6) had a monomer concentration of 42 weight % and a neutralization rate of 75 mol %, and a supplied amount of the aqueous monomer solution (6) to the continuous belt polymerization device was 28.4 g/s.

The continuous belt polymerization device is a polymerizer having an effective length of 2 m that is defined by a length from the supplying nozzle for supplying an aqueous monomer solution to a part from which a hydrogel is discharged. The belt is an endless belt which has a surface coated with a silicone resin, and a transferring speed (running speed) was set to 1 cm/s.

A temperature (solution temperature) of the aqueous monomer solution (6) which had been supplied to the continuous belt polymerization device was measured with use of an infrared thermometer, and the temperature was 90° C. in the vicinity of an outlet of the supplying nozzle. Moreover, a rise in the temperature was confirmed at a point which was 20 cm downstream from the outlet of the supplying nozzle. This showed that polymerization started at the point. Immediately after that, the hydrogel was swollen while generating water vapor and was then shrunk approximately 70 seconds later. By the above operations, a belt-like hydrogel (6) was obtained.

Note that a retention time from when the internal crosslinking agent was added to when the aqueous monomer solution (6) was supplied to the continuous belt polymerization device was 120 seconds, and a retention time from when 48 weight % of aqueous sodium hydroxide solution was added to and mixed with the mixed solution (6) to when the aqueous monomer solution (6) was supplied to the continuous belt polymerization device was 15 seconds. Moreover, a retention time from when the aqueous monomer solution (6) was supplied to the continuous belt polymerization device to when the polymerization started was 20 seconds (20 cm÷1 cm/s). That is, a total retention time from when the aqueous sodium hydroxide solution was added and mixed to when the polymerization started was 35 seconds.

The belt-like hydrogel (6) which had been obtained was subjected to gel-crushing with use of a meat chopper (18 mm in die pore diameter), and thus a particulate hydrogel (6) was obtained. Then, the particulate hydrogel (6) was dried in a stationary hot air dryer (manufactured by Satake Chemical Equipment Mfg Ltd.; Type 71-6S) at a temperature of 180° C. for 30 minutes, and thus a dried polymer (6) was obtained. Note that, in the drying, the particulate hydrogel (6) was placed with a thickness of 5 cm on a metal gauze having a length of 30 cm and a breadth of 20 cm.

Then, the dried polymer (6) was subjected to crushing with use of a roll mill, and was classified with use of JIS standard sieves having respective mesh sizes of 850 μm and 150 μm. Thus, water-absorbing resin powder (6) was obtained which had a particle diameter of equal to or larger than 150 μm and smaller than 850 μm.

The water-absorbing resin powder (6) thus obtained had a weight average particle diameter (D50) of 380 μm, a moisture content of 5 weight %, a CRC of 37 g/g, an Ext of 10 weight %, a residual monomer of 470 ppm, and a FSR of 0.23 g/g/s. No residual internal crosslinking agent was detected (detection limit; less than 1 ppm).

Comparative Reference Example 1

Comparative water-absorbing resin powder (6) was obtained by carrying out operations similar to Reference Example 1, except that a length of the pipe up to the point where the aqueous sodium persulfate solution was added after 48 weight % of aqueous sodium hydroxide solution had been added to and mixed with the mixed solution (6) was extended in a state of being subjected to heat-retention. Note that the static mixer was provided immediately before addition of the aqueous sodium persulfate solution.

In Comparative Reference Example 1, a retention time from when 48 weight % of aqueous sodium hydroxide solution was added to and mixed with the mixed solution (6) to when the aqueous monomer solution (6) was supplied to the continuous belt polymerization device was 100 seconds. Moreover, a temperature rise in the polymerization step was confirmed at a point 20 cm downstream from the outlet of the supplying nozzle for supplying the aqueous monomer solution, and therefore a retention time from when the aqueous monomer solution (6) was supplied to the continuous belt polymerization device to when the polymerization started was 20 seconds (20 cm÷1 cm/s). That is, a total retention time from when the aqueous sodium hydroxide solution was added and mixed to when the polymerization started was 120 seconds.

The comparative water-absorbing resin powder (6) thus obtained had a weight average particle diameter (D50) of 380 μm, a moisture content of 5 weight %, a CRC of 38 g/g, an Ext of 12 weight %, a residual monomer of 470 ppm, a FSR of 0.21 g/g/s, and a residual internal crosslinking agent of 3 ppm.

It was confirmed that the Ext of the water-absorbing resin powder was improved by employing the method (use of the water-insoluble internal crosslinking agent) of the present invention.

Reference Example 2

Water-absorbing resin powder (7) was obtained by carrying out operations similar to Reference Example 1, except that the chelating agent was changed to 0.060 g/s of 20 weight % of β-thujapricin acrylic acid solution and the internal crosslinking agent was changed to 0.176 g/s of 20 weight % of aqueous polyethyleneglycol diacrylate solution. Note that the β-thujapricin had a solubility of 1 g/l in water at 25° C., and an added amount of the β-thujapricin was 1000 ppm per a monomer. Moreover, the polyethyleneglycol diacrylate had an average molecular weight of 523, and an added amount of the polyethyleneglycol diacrylate was 0.05 mol % per a monomer.

The aqueous monomer solution (7) had a monomer concentration of 42 weight % and a neutralization rate of 75 mol %, and a supplied amount of the aqueous monomer solution (7) to the continuous belt polymerization device was 28.5 g/s.

In Reference Example 2, a retention time from when 48 weight % of aqueous sodium hydroxide solution was added to and mixed with the mixed solution (7) to when the aqueous monomer solution (7) was supplied to the continuous belt polymerization device was 15 seconds. Moreover, a temperature rise in the polymerization step was confirmed at a point 20 cm downstream from the outlet of the supplying nozzle for supplying the aqueous monomer solution, and therefore a retention time from when the aqueous monomer solution (7) was supplied to the continuous belt polymerization device to when the polymerization started was 20 seconds (20 cm÷1 cm/s). That is, a total retention time from when the aqueous sodium hydroxide solution was added and mixed to when the polymerization started was 35 seconds.

The water-absorbing resin powder (7) thus obtained had a weight average particle diameter (D50) of 380 μm, a moisture content of 5 weight %, a CRC of 37 g/g, an Ext of 10 weight %, a residual monomer of 470 ppm, and a FSR of 0.23 g/g/s.

Subsequently, a surface-crosslinking agent solution containing 0.3 parts by weight of ethylene carbonate, 0.5 parts by weight of propylene glycol, and 3 parts by weight of ion exchange water was evenly mixed with 100 parts by weight of the water-absorbing resin powder (7), and heating treatment was carried out in an oven at 200° C. for 40 minutes. Then, a resultant product was caused to pass through a JIS standard sieve having a mesh size of 850 μm, and thus a water-absorbing resin (7) was obtained. Table 2 indicates physical properties of the water-absorbing resin (7).

Comparative Reference Example 2

Comparative water-absorbing resin powder (7) was obtained by carrying out operations similar to Reference Example 2, except that a length of the pipe up to the point where the aqueous sodium persulfate solution was added after 48 weight % of aqueous sodium hydroxide solution had been added to and mixed with the mixed solution (7) was extended in a state of being subjected to heat-retention, as with Comparative Reference Example 1. Note that the static mixer was provided immediately before addition of the aqueous sodium persulfate solution.

In Comparative Reference Example 2, a retention time from when 48 weight % of aqueous sodium hydroxide solution was added to and mixed with the mixed solution (7) to when the aqueous monomer solution (7) was supplied to the continuous belt polymerization device was 100 seconds. Moreover, a temperature rise in the polymerization step was confirmed at a point 25 cm downstream from the outlet of the supplying nozzle for supplying the aqueous monomer solution, and therefore a retention time from when the aqueous monomer solution (7) was supplied to the continuous belt polymerization device to when the polymerization started was 25 seconds (25 cm÷1 cm/s). That is, a total retention time from when the aqueous sodium hydroxide solution was added and mixed to when the polymerization started was 125 seconds.

The comparative water-absorbing resin powder (7) thus obtained had a weight average particle diameter (D50) of 380 μm, a moisture content of 5 weight %, a CRC of 39 g/g, an Ext of 12 weight %, a residual monomer of 470 ppm, and a FSR of 0.21 g/g/s.

Subsequently, a comparative water-absorbing resin (7) was obtained by carrying out surface cross-linking similar to that of Reference Example 2 with respect to the comparative water-absorbing resin powder (7). Table 2 indicates physical properties of the comparative water-absorbing resin (7).

TABLE 2

|  |  | CRC [g/g] | Degradable soluble component [wt %] |
|---|---|---|---|
| Reference Example 2 | Water-absorbing resin (7) | 29 | 17 |
| Comparative Reference Example 2 | Comparative water-absorbing resin (7) | 30 | 26 |

The chelating agent has an effect of restricting a degradable soluble component and, from results of Reference Example 2 and Comparative Reference Example 2, it was found that efficiency in adding the chelating agent was improved by the method of the present invention.

Reference Example 3

Water-absorbing resin powder (8) was obtained by carrying out operations similar to Reference Example 1, except that the internal crosslinking agent was changed to 0.176 g/s of 20 weight % of aqueous polyethyleneglycol diacrylate solution, that 0.069 g/s of 1 weight % of 1-hydroxycyclohexylphenylketone acrylic acid solution was concurrently added, as a water-insoluble photodegradable polymerization initiator, together with the chelating agent and the internal crosslinking agent, and that a UV lamp was provided in the vicinity of the hydrogel outlet of the continuous belt polymerization device. Note that the polyethyleneglycol diacrylate had an average molecular weight of 523, and an added amount of the polyethyleneglycol diacrylate was 0.05 mol % per a monomer. Moreover, the 1-hydroxycyclohexylphenylketone had a molecular weight of 204 and a solubility of 0.1 g/l in water at 25° C., and an added amount of the 1-hydroxycyclohexylphenylketone was 0.025 mol % per a monomer.

The aqueous monomer solution (8) had a monomer concentration of 42 weight % and a neutralization rate of 75 mol %, and a supplied amount of the aqueous monomer solution (8) to the continuous belt polymerization device was 28.6 g/s.

In Reference Example 3, a retention time from when 48 weight % of aqueous sodium hydroxide solution was added to and mixed with the mixed solution (8) to when the aqueous monomer solution (8) was supplied to the continuous belt polymerization device was 15 seconds. Moreover, a temperature rise in the polymerization step was confirmed at a point 20 cm downstream from the outlet of the supplying nozzle for supplying the aqueous monomer solution, and therefore a retention time from when the aqueous monomer solution (8) was supplied to the continuous belt polymerization device to when the polymerization started was 20 seconds (20 cm÷1 cm/s). That is, a total retention time from when the aqueous sodium hydroxide solution was added and mixed to when the polymerization started was 35 seconds.

The water-absorbing resin powder (8) thus obtained had a weight average particle diameter (D50) of 380 μm, a moisture content of 5 weight %, a CRC of 37 g/g, an Ext of 10 weight %, a residual monomer of 380 ppm, and a FSR of 0.23 g/g/s.

Comparative Reference Example 3

Comparative water-absorbing resin powder (8) was obtained by carrying out operations similar to Reference Example 3, except that a length of the pipe up to the point where the aqueous sodium persulfate solution was added after 48 weight % of aqueous sodium hydroxide solution had been added to and mixed with the mixed solution (8) was extended in a state of being subjected to heat-retention, as with Comparative Reference Example 1. Note that the static mixer was provided immediately before addition of the aqueous sodium persulfate solution.

In Comparative Reference Example 3, a retention time from when 48 weight % of aqueous sodium hydroxide solution was added to and mixed with the mixed solution (8) to when the aqueous monomer solution (8) was supplied to the continuous belt polymerization device was 100 seconds. Moreover, a temperature rise in the polymerization step was confirmed at a point 20 cm downstream from the outlet of the supplying nozzle for supplying the aqueous monomer solution, and therefore a retention time from when the aqueous monomer solution (8) was supplied to the continuous belt polymerization device to when the polymerization started was 20 seconds (20 cm÷1 cm/s). That is, a total retention time from when the aqueous sodium hydroxide solution was added and mixed to when the polymerization started was 120 seconds.

The comparative water-absorbing resin powder (8) thus obtained had a weight average particle diameter (D50) of 380 μm, a moisture content of 5 weight %, a CRC of 37 g/g, an Ext of 10 weight %, a residual monomer of 420 ppm, and a FSR of 0.21 g/g/s.

It was confirmed that a reduction in the residual monomer of the water-absorbing resin powder was improved by employing the method (use of the water-insoluble polymerization initiator) of the present invention.

Reference Example 4

Water-absorbing resin powder (9) was obtained by carrying out operations similar to Reference Example 1, except that the chelating agent was changed to 0.060 g/s of 20 weight % of β-thujapricin acrylic acid solution, that 0.069 g/s of 1 weight % of 1-hydroxycyclohexylphenylketone acrylic acid solution was concurrently added, as a water-insoluble photodegradable polymerization initiator, together with the chelating agent and the internal crosslinking agent, and that a UV lamp was provided in the vicinity of the hydrogel outlet of the continuous belt polymerization device. Note that the β-thujapricin had a solubility of 1 g/l in water at 25° C. and an added amount of the β-thujapricin was 1000 ppm per a monomer. Moreover, the 1-hydroxycyclohexylphenylketone had a molecular weight of 204 and a solubility of 0.1 g/l in water at 25° C., and an added amount of the 1-hydroxycyclohexylphenylketone was 0.025 mol % per a monomer.

The aqueous monomer solution (9) had a monomer concentration of 42 weight % and a neutralization rate of 74 mol %, and a supplied amount of the aqueous monomer solution (9) to the continuous belt polymerization device was 28.5 g/s.

In Reference Example 4, a retention time from when 48 weight % of aqueous sodium hydroxide solution was added to and mixed with the mixed solution (9) to when the aqueous monomer solution (9) was supplied to the continuous belt polymerization device was 15 seconds. Moreover, a temperature rise in the polymerization step was confirmed at a point 20 cm downstream from the outlet of the supplying nozzle for supplying the aqueous monomer solution, and therefore a retention time from when the aqueous monomer solution (9) was supplied to the continuous belt polymerization device to when the polymerization started was 20 seconds (20 cm÷1 cm/s). That is, a total retention time from when the aqueous sodium hydroxide solution was added and mixed to when the polymerization started was 35 seconds.

The water-absorbing resin powder (9) thus obtained had a weight average particle diameter (D50) of 380 μm, a moisture content of 5 weight %, a CRC of 37 g/g, an Ext of 10 weight %, a residual monomer of 380 ppm, and a FSR of 0.23 g/g/s.

Comparative Reference Example 4

Comparative water-absorbing resin powder (9) was obtained by carrying out operations similar to Reference Example 1, except that the internal crosslinking agent was changed to 0.176 g/s of 20 weight % of aqueous polyethyleneglycol diacrylate solution. Note that the polyethyleneglycol diacrylate had an average molecular weight of 523, and an added amount of the polyethyleneglycol diacrylate was 0.05 mol % per a monomer.

The comparative aqueous monomer solution (9) had a monomer concentration of 42 weight % and a neutralization rate of 75 mol %, and a supplied amount of the comparative aqueous monomer solution (9) to the continuous belt polymerization device was 28.5 g/s.

In Comparative Reference Example 4, a retention time from when 48 weight % of aqueous sodium hydroxide solution was added to and mixed with the comparative mixed solution (9) to when the comparative aqueous monomer solution (9) was supplied to the continuous belt polymerization device was 15 seconds. Moreover, a temperature rise in the polymerization step was confirmed at a point 20 cm downstream from the outlet of the supplying nozzle for supplying the aqueous monomer solution, and therefore a retention time from when the comparative aqueous monomer solution (9) was supplied to the continuous belt polymerization device to when the polymerization started was 20 seconds (20 cm÷1 cm/s). That is, a total retention time from when the aqueous sodium hydroxide solution was added and mixed to when the polymerization started was 35 seconds.

The comparative water-absorbing resin powder (9) thus obtained had a weight average particle diameter (D50) of 380 µm, a moisture content of 5 weight %, a CRC of 37 g/g, an Ext of 10 weight %, a residual monomer of 470 ppm, and a FSR of 0.21 g/g/s.

Example 6

Acrylic acid, 48 weight % of aqueous sodium hydroxide solution, and ion exchange water were continuously mixed, and thus an aqueous solution (10) in which a concentration of sodium acrylate was 43 weight % and a neutralization rate was 75 mol % and which was at a temperature of 95° C. was continuously prepared. Note that the acrylic acid contained 70 ppm of p-methoxyphenol.

Subsequently, 0.060 g/s of 1 weight % of aqueous diethylene triamine pentaacetate pentasodium solution as a chelating agent, 0.620 g/s of 20 weight % of water-absorbing resin fine powder acrylic acid dispersion as a polymer, and 0.176 g/s of 20 weight % of aqueous polyethyleneglycol diacrylate solution as an internal crosslinking agent were added to 27.8 g/s of the aqueous solution (10). A resultant product was mixed by forced stirring (stirring Reynolds number; 50000) with an in-line mixer, and thus a mixed solution (10) was obtained. Note that an average molecular weight of the polyethyleneglycol diacrylate was 523, and an added amount of the polyethyleneglycol diacrylate was 0.05 mol % per a monomer. Moreover, the water-absorbing resin fine powder was powder which was obtained in the classification step of Comparative Example 5 and passed through a JIS standard sieve having a mesh size of 150 µm.

Next, the mixed solution (10) was transferred via a pipe. In so doing, the mixed solution (10) was stirred with use of a static mixer that was provided in the pipe at a downstream side end of the pipe and, immediately after that, 0.562 g/s of 3 weight % of aqueous sodium persulfate solution was added as a polymerization initiator and line mixing was carried out. Thus, an aqueous monomer solution (10) was obtained. Note that sodium persulfate had a formula weight of 238, and an added amount of the sodium persulfate was 0.05 mol % per a monomer.

Subsequently, the aqueous monomer solution (10) was supplied to a continuous belt polymerization device with use of a supplying nozzle having a length of 0.5 m. Note that stirring Reynolds numbers were as follows: that is, 1500 in the pipe before (upstream) of the static mixer; 5000 in the static mixer; and 3000 in the supplying nozzle. Moreover, a monomer concentration of the aqueous monomer solution (10) was 43 weight %, a neutralization rate of the aqueous monomer solution (10) was 71 mol %, and a supplied amount of the aqueous monomer solution (10) to the continuous belt polymerization device was 29.2 g/s.

The continuous belt polymerization device is a polymerizer having an effective length of 2 m that is defined by a length from the supplying nozzle for supplying an aqueous monomer solution to a part from which a hydrogel is discharged. The belt is an endless belt which has a surface coated with a silicone resin, and a transferring speed (running speed) was set to 1 cm/s.

A temperature (solution temperature) of the aqueous monomer solution (10) which had been supplied to the continuous belt polymerization device was measured with use of an infrared thermometer, and the temperature was 88° C. in the vicinity of an outlet of the supplying nozzle. Moreover, a rise in the temperature was confirmed at a point which was 22 cm downstream from the outlet of the supplying nozzle. This showed that polymerization started at the point. Immediately after that, the hydrogel was swollen while generating water vapor and was then shrunk approximately 70 seconds later. By the above operations, a belt-like hydrogel (10) was obtained.

Note that a retention time from when the acrylic acid dispersion of the water-absorbing resin fine powder was added to when the aqueous monomer solution (10) was supplied to the continuous belt polymerization device was 15 seconds, and a retention time from when the aqueous monomer solution (10) was supplied to the continuous belt polymerization device to when the polymerization started was 22 seconds (22 cm÷1 cm/s). That is, a total retention time from when the acrylic acid dispersion of the water-absorbing resin fine powder was added to when the polymerization started was 37 seconds.

The belt-like hydrogel (10) which had been obtained was subjected to gel-crushing with use of a meat chopper (18 mm in die pore diameter), and thus a particulate hydrogel (10) was obtained. Then, the particulate hydrogel (10) was dried in a stationary hot air dryer (manufactured by Satake Chemical Equipment Mfg Ltd.; Type 71-6S) at a temperature of 180° C. for 30 minutes, and thus a dried polymer (10) was obtained. Note that, in the drying, the particulate hydrogel (10) was placed with a thickness of 5 cm on a metal gauze having a length of 30 cm and a breadth of 20 cm.

Then, the dried polymer (10) was subjected to crushing with use of a roll mill, and was classified with use of JIS standard sieves having respective mesh sizes of 850 µm and 150 µm. Thus, water-absorbing resin powder (10) was obtained which had a particle diameter of equal to or larger than 150 µm and smaller than 850 µm.

The water-absorbing resin powder (10) thus obtained had a weight average particle diameter (D50) of 380 µm, a moisture content of 5 weight %, a CRC of 37 g/g, an Ext of 11 weight %, a residual monomer of 480 ppm, and a FSR of 0.23 g/g/s.

Comparative Example 6

Comparative water-absorbing resin powder (10) was obtained by carrying out operations similar to Example 6, except that a length of the pipe up to the position where the aqueous sodium persulfate solution was added was extended in a state of being subjected to heat-retention. Note that the static mixer was provided immediately before addition of the aqueous sodium persulfate solution.

In Comparative Example 6, a retention time from when the acrylic acid dispersion of the water-absorbing resin fine powder was added to when the aqueous monomer solution (10) was supplied to the continuous belt polymerization device was 100 seconds. Moreover, a temperature rise in the polymerization step was confirmed at a point 22 cm downstream from the outlet of the supplying nozzle for supplying the aqueous monomer solution, and therefore a retention time from when the aqueous monomer solution (10) was supplied to the continuous belt polymerization device to when the polymerization started was 22 seconds (22 cm÷1 cm/s). That is, a total retention time from when the water-absorbing resin fine powder was added to when the polymerization started was 122 seconds.

The comparative water-absorbing resin powder (10) thus obtained had a weight average particle diameter (D50) of 380 µm, a moisture content of 5 weight %, a CRC of 36 g/g, an Ext of 11 weight %, a residual monomer of 510 ppm, and a FSR of 0.21 g/g/s.

It was confirmed that the FSR of the water-absorbing resin powder was improved and the residual monomer was reduced by employing the method of the present invention in which the polymer (water-absorbing resin fine powder) was added as a water-insoluble additive and the retention time from when the water-insoluble additive was added to when the polymerization started was controlled to 1 second to 60 seconds.

INDUSTRIAL APPLICABILITY

A water-absorbing resin production method in accordance with the present invention yields excellent efficiency with which an additive is to be used in an actual production process and is suitable for production of a hygienic material or the like which is highly functional and highly safe.

The invention claimed is:

1. A method for producing a polyacrylic acid (salt)-based water-absorbing resin, comprising the steps of:
   (A) preparing an aqueous monomer solution that is subjected to crosslinking and polymerization to produce a hydrogel-forming crosslinked polymer;
   (B) polymerizing the aqueous monomer solution to obtain a hydrogel-forming crosslinked polymer; and
   (C) drying the hydrogel-forming crosslinked polymer to obtain a dried polymer,
   wherein the step (A) includes the steps of:
      (a) preparing an aqueous solution; and
      (b) adding a water-insoluble additive and/or gas bubbles,
   wherein a retention time from a time point at which the water-insoluble additive and/or the gas bubbles is/are added in the step (b) until a time point at which the polymerization is started in the step (B) is 1 to 60 seconds,
   wherein the time point at which the water-insoluble additive and/or the gas bubbles is/are added is defined by a time point at which the water-insoluble additive and/or the gas bubbles come(s) into contact with the aqueous solution,
   wherein the time point at which the polymerization is started is defined by a time point at which a rise in a temperature of the aqueous monomer solution due to heat of the polymerization starts,
   wherein the polymerization in the step (B) is a continuous polymerization, and
   wherein at least one, two, or three of the following is satisfied:
      (1) a temperature of the aqueous solution in the step (b) is equal to or higher than 40° C. and is equal to or lower than a boiling point;
      (2) the mixed solution during the step (b) is stirred at a stirring Reynolds number of equal to or more than 1000; and
      (3) the mixed solution during the step (b) is stirred by a forced stirring.

2. The method according to claim 1, wherein, in the step (b), a water content of a mixed solution is equal to or more than 50 weight %.

3. The method according to claim 1, wherein the water-insoluble additive is at least one selected from: an internal crosslinking agent, a polymerization initiator, a reducing agent, a chain transfer agent, a foaming agent, a surfactant, a chelating agent, inorganic fine particles and a polymer.

4. The method according to claim 1, wherein a solubility of the water-insoluble additive in water at 25° C. is equal to or less than 10 g/l.

5. The method according to claim 1, wherein a solubility of the water-insoluble additive in 40 weight % of an aqueous solution of an acrylic acid sodium salt at 25° C. (neutralization rate: 70 mol %) is equal to or less than 10 g/l.

6. The method according to claim 1, wherein the polymerization in the step (B) is a continuous belt polymerization or a continuous kneader polymerization.

7. The method according to claim 1, wherein the mixed solution during the step (b) is supplied to a polymerization device via a pipe at an average speed of between 0.1 and 10 m/s.

8. The method according to claim 1, wherein the mixed solution during the step (b) is supplied to a polymerization device via a pipe and a static type line mixer is provided in the pipe.

* * * * *